US008605787B2

(12) United States Patent
Iketani

(10) Patent No.: US 8,605,787 B2
(45) Date of Patent: Dec. 10, 2013

(54) IMAGE PROCESSING SYSTEM, IMAGE PROCESSING METHOD, AND RECORDING MEDIUM STORING IMAGE PROCESSING PROGRAM

(75) Inventor: Akihiko Iketani, Tokyo (JP)

(73) Assignee: NEC Corporation, Tokyo (JP)

( * ) Notice: Subject to any disclaimer, the term of this patent is extended or adjusted under 35 U.S.C. 154(b) by 484 days.

(21) Appl. No.: 12/920,304

(22) PCT Filed: Mar. 13, 2009

(86) PCT No.: PCT/JP2009/054899
§ 371 (c)(1),
(2), (4) Date: Aug. 30, 2010

(87) PCT Pub. No.: WO2009/119347
PCT Pub. Date: Oct. 1, 2009

(65) Prior Publication Data
US 2011/0001884 A1  Jan. 6, 2011

(30) Foreign Application Priority Data

Mar. 28, 2008  (JP) ................................. 2008-085559
Nov. 26, 2008  (JP) ................................. 2008-301508

(51) Int. Cl.
*H04B 1/66* (2006.01)
(52) U.S. Cl.
USPC ............ 375/240.16; 375/240.15; 375/240.14; 375/240.12; 382/236; 382/238; 382/237; 382/239
(58) Field of Classification Search
USPC ............. 375/240.16, 240.15, 240.14, 240.12; 382/236, 238, 237, 239
See application file for complete search history.

(56) References Cited

U.S. PATENT DOCUMENTS

| 6,414,992 | B1 * | 7/2002 | Sriram et al. | 375/240.13 |
|---|---|---|---|---|
| 7,433,494 | B2 * | 10/2008 | Niwa | 382/103 |
| 8,064,522 | B2 * | 11/2011 | Kondo et al. | 375/240.16 |
| 8,085,848 | B2 * | 12/2011 | Kurata | 375/240.16 |

FOREIGN PATENT DOCUMENTS

| JP | 10-224802 A | 8/1998 |
|---|---|---|
| JP | 2003-163894 A | 6/2003 |
| JP | 2005-236459 A | 9/2005 |
| JP | 2005-252569 A | 9/2005 |
| JP | 2005-318576 A | 11/2005 |
| JP | 2006-166061 A | 6/2006 |
| JP | 2006-197387 A | 7/2006 |

* cited by examiner

*Primary Examiner* — Shawn An
(74) *Attorney, Agent, or Firm* — Sughrue Mion, PLLC

(57) ABSTRACT

Provided is an image processing system that can uniquely identify a motion vector for each pixel of an interpolation frame and accurately identify a motion vector. A motion vector candidate selection unit (301) sequentially selects predetermined motion vector candidates in an interpolation frame. A differential image generation unit (302), a binary image generation unit (303) and an area image generation unit (304) generate a differential image, a binary image and an area image, respectively, based on a selected motion vector candidate. For each pixel of the interpolation frame, a motion vector determination unit (305) identifies a motion vector candidate with which a pixel value of a pixel in the area image corresponding to the pixel is the largest as a motion vector. A pixel value determination unit (306) determines each pixel value of the interpolation frame by using the motion vector identified for each pixel, thereby generating an interpolation frame.

18 Claims, 11 Drawing Sheets

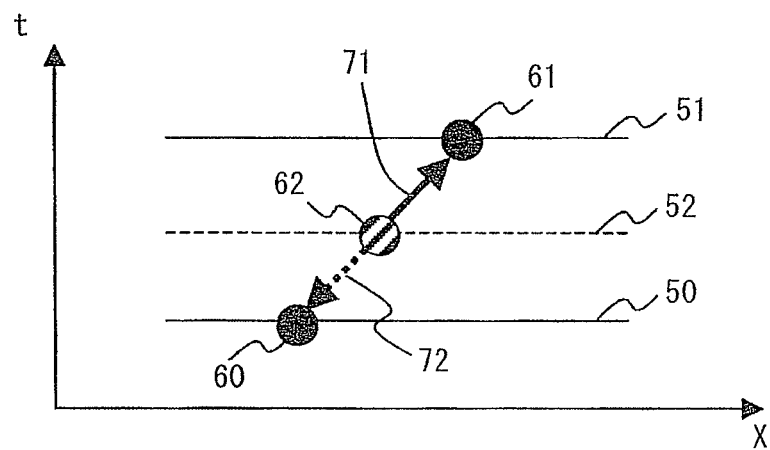
Fig. 2
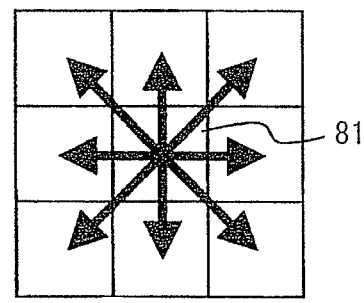
Fig. 3A
Fig. 3B
(-1,-1) (0,-1) (1,-1)
(-1, 0) (0, 0) (1, 0)
(-1, 1) (0, 1) (1, 1)

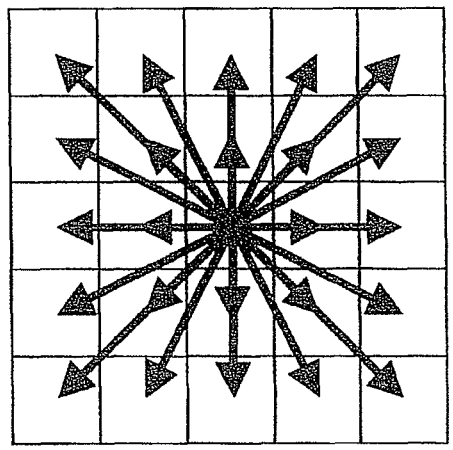
Fig. 4A
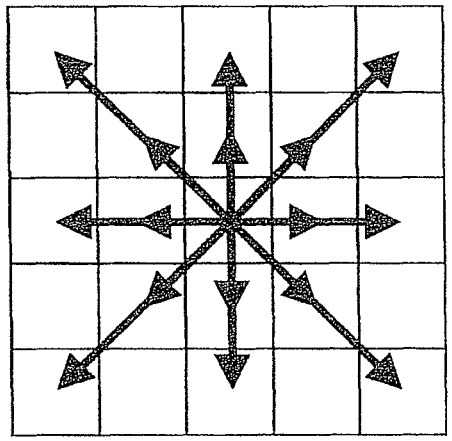
Fig. 4B
Fig. 5

|   |   |   |   |   |
|---|---|---|---|---|
| 0 | 0 | 6 | 0 | 0 |
| 0 | 6 | 6 | 0 | 0 |
| 6 | 6 | 0 | 0 | 0 |
| 6 | 0 | 0 | 4 | 4 |
| 0 | 0 | 0 | 4 | 4 |

Fig. 6

|   |   |   |
|---|---|---|
| 0 | 1 | 0 |
| 1 | 0 | 1 |
| 0 | 1 | 0 |

Fig. 7

IMAGE PROCESSING SYSTEM, IMAGE PROCESSING METHOD, AND RECORDING MEDIUM STORING IMAGE PROCESSING PROGRAM

TECHNICAL FIELD

The present invention relates to an image processing system, an image processing method and an image processing program and, particularly, to an image processing system, an image processing method and an image processing program that interpolate a frame between consecutive frames.

BACKGROUND ART

A frame rate can be improved by newly interpolating a frame between consecutive frames of a motion picture. A frame to be interpolated is referred to hereinafter as an interpolation frame.

FIG. 15 is an explanatory view showing an interpolation frame that is generated in general interpolation frame generation processing. Frames 100 and 101 shown in FIG. 15 are two consecutive frames, and an interpolation frame 106 is generated as a frame to be interpolated between them. In FIG. 15, pixels of the given two frames 100 and 101 are indicated by black, and pixels of the interpolation frame 106 whose pixel values are to be specified are indicated by oblique lines.

Each frame includes pixels arranged in the x-axis direction and the y-axis direction. The t-axis shown in FIG. 15 represents time when frames are switched. Although the y-axis of frames is omitted in FIG. 15, FIG. 16 shows the two consecutive frames 100 and 101 and the interpolation frame which are illustrated without omitting the y-axis. Further, of the two consecutive frames, the frame to be displayed precedently is referred to as a first frame, and the frame to be displayed subsequently is referred to as a second frame. In other words, of the two consecutive frames, the precedent frame on the time axis is the first frame, and the subsequent frame is the second frame.

In the case of generating the interpolation frame 106 between the first frame 100 and the second frame 101, the correspondence between a pixel in the first frame 100 and a pixel in the second frame 101 is estimated, and a motion vector from a pixel in the first frame 100 to a corresponding pixel in the second frame 101 is estimated. In FIG. 15, such a motion vector is indicated by an arrow. A motion vector from a pixel at coordinates (xT, yT) in the first frame 100 to a corresponding pixel in the second frame 101 is referred to as (uT, vT).

After estimating the motion vector, a position in which the motion vector from the pixel in the first frame 100 to the corresponding pixel in the second frame 101 passes through the interpolation frame is identified. The position is (xT+uT/2, yT+vT/2). Then, the pixel value of a pixel in the position is set to the average value of the pixel in the first frame 100 and the corresponding pixel in the second frame 101.

For example, in FIG. 15, a pixel 102 in the first frame 100 and a pixel 104 in the second frame correspond to each other. In this case, if the coordinates of the pixel 102 is (xT, yT), and a motion vector 103 from the pixel 102 to the corresponding pixel 104 is (uT, vT), the position on the interpolation frame which the motion vector 103 passes through is (xT+uT/2, yT+vT/2). Then, the pixel value of (xT+uT/2, yT+vT/2) in the interpolation frame (i.e. the pixel value of a pixel 105 in FIG. 15) is defined as the average value of the pixel values of the pixels 102 and 104.

Further, in the estimation of a motion vector, template matching is performed in units of blocks of a certain size. For example, there is a technique that identifies a motion vector by searching, with respect to each pixel of the first frame 100, for a block in the second frame 200 corresponding to a block of a certain size centering on the pixel. An example of the template matching is described in the patent document 1. In the patent document 1, a motion vector detection method is described that calculates the sum of absolute differences of the respective pixels of a reference block of an image of a previous field and a reference block of an image of a subsequent field with respect to each candidate for a motion vector and sets a vector indicating the minimum value as a motion vector. Further, in the patent document 2, a motion detection method is described that calculates a motion vector from a plurality of candidate vectors.

In the template matching, it is presumed that the shape of an object to be displayed is a block of a certain size, and a pair of blocks of the certain size corresponding to each other is identified between two consecutive frames.

[Patent Document 1]
Japanese Unexamined Patent Application Publication No. 2006-166061 (Paragraph 0011)
[Patent Document 2]
Japanese Unexamined Patent Application Publication No. 2005-318576 (Paragraphs 0031-0033)

DISCLOSURE OF INVENTION

Technical Problem

In the general interpolation frame generation processing, there have been cases where a pixel value cannot be identified. FIG. 17 shows an example of pixels in an interpolation frame whose pixel values cannot be specified. In the general interpolation frame generation processing described above with reference to FIG. 15, a motion vector from each pixel in the first frame 100 to a corresponding pixel in the second frame 200 is estimated, and then a pixel value is assigned to a pixel of an interpolation frame through which the motion vector passes.

However, a motion vector from a pixel in the first frame 100 to a pixel in the second frame 200 does not always pass through every pixel in the interpolation frame 106. In the general method described above with reference to FIG. 15, a pixel value cannot be specified for a pixel through which the motion vector does not pass in the interpolation frame 106. Pixels 107 and 108 illustrated in FIG. 17 show the pixels whose pixel values cannot be identified because the motion vector does not pass through them as described above.

Further, a plurality of motion vectors can pass through a pixel of the interpolation frame 106 in some cases. Because a plurality of pixel values can be assigned to such a pixel, a pixel value cannot be uniquely identified. For example, for a pixel 109 shown in FIG. 17, pixel values can be calculated from two pairs of pixels in the frames 100 and 101, and therefore a pixel value cannot be uniquely specified.

Further, in the template matching for specifying a motion vector, there have been cases where a motion vector cannot be estimated correctly. FIG. 18 is an explanatory view showing the case where a motion vector cannot be estimated. FIG. 18 shows two consecutive frames 200 and 201 that display two objects A and B which move in different directions. As shown in FIG. 18, although the objects A and B are placed closely in the first frame 200, they are placed apart in the second frame 201. In FIG. 18, blocks used in the template matching are indicated by a dotted rectangle.

If, in the frames 200 and 201 illustrated in FIG. 18, the template matching is performed by using a block 206 which is smaller than the object, a plurality of blocks corresponding to the block 206 are defined in the frame 201. For example, any of blocks 209 shown in the frame 201 in FIG. 18 can be selected as a block corresponding to the block 206. In this manner, because a plurality of blocks that can correspond to the block 206 exist, a motion vector from the block 206 to a block in the second frame 201 cannot be uniquely identified.

Further, if the template matching is performed by using a block 207 which is larger than the object, a block that includes the objects A and B as shown in the block 207 does not exist in the second frame 201. In other words, a block corresponding to the block 207 cannot be identified from the second frame 201. Accordingly, a motion vector cannot be identified.

Further, in the template matching related to a block at the boundary of objects in different motions like a block 208 shown in FIG. 18, a corresponding block cannot be identified from the second frame 202 with use of a block of any size. Consequently, a motion vector cannot be identified.

Further, although it is ideal in the template matching to use a block of the same shape as an object to be displayed, because the shape or the like of an object to be displayed in a frame is unknown, it is difficult to perform the template matching with such an ideal block.

In view of the foregoing, an object of the present invention to provide an image processing system, an image processing method and an image processing program that can uniquely identify a motion vector for each pixel of an interpolation frame and can identify a motion vector with high accuracy.

Technical Solution

An image processing system according to the present invention is an image processing system for generating an interpolation frame to be inserted between one frame and another frame, which includes a motion vector candidate selection unit that selects predetermined motion vector candidates one after another, a differential image generation unit that calculates a difference between a pixel in said one frame and a pixel in said another frame specified by a pixel in an interpolation frame and a motion vector candidate selected by the motion vector candidate selection unit and generates a differential image where the difference is assigned to a pixel at the same coordinates as the pixel in the interpolation frame, a binary image generation unit that generates a binary image where the differential image is binarized, an area image generation unit that generates an area image where a pixel value of a pixel applicable to non-difference in the binary image is set to an area of a region where the pixel is linked and a pixel value of a pixel applicable to difference in the binary image is set to a given value, a motion vector identifying unit that identifies a motion vector candidate with which a pixel value of a corresponding pixel in the area image is the largest as a motion vector with respect to each pixel in the interpolation frame, and a pixel value determination unit that determines a pixel value based on a pixel in said one frame and a pixel in said another frame specified by a motion vector identified by the motion vector identifying unit with respect to each pixel in the interpolation frame.

An image processing method according to the present invention is an image processing method for generating an interpolation frame to be inserted between one frame and another frame, which includes selecting predetermined motion vector candidates one after another, calculating a difference between a pixel in said one frame and a pixel in said another frame specified by a pixel in an interpolation frame and a selected motion vector candidate and generating a differential image where the difference is assigned to a pixel at the same coordinates as the pixel in the interpolation frame, generating a binary image where the differential image is binarized, generating an area image where a pixel value of a pixel applicable to non-difference in the binary image is set to an area of a region where the pixel is linked and a pixel value of a pixel applicable to difference in the binary image is set to a given value, identifying a motion vector candidate with which a pixel value of a corresponding pixel in the area image is the largest as a motion vector with respect to each pixel in the interpolation frame, and determining a pixel value based on a pixel in said one frame and a pixel in said another frame specified by an identified motion vector with respect to each pixel in the interpolation frame.

A recording medium storing an image processing program according to the present invention is a recording medium storing an image processing program for generating an interpolation frame to be inserted between one frame and another frame, the image processing program causing a computer to execute motion vector candidate selection processing that selects predetermined motion vector candidates one after another, differential image generation processing that calculates a difference between a pixel in said one frame and a pixel in said another frame specified by a pixel in an interpolation frame and a motion vector candidate selected by the motion vector candidate selection processing and generates a differential image where the difference is assigned to a pixel at the same coordinates as the pixel in the interpolation frame, binary image generation processing that generates a binary image where the differential image is binarized, area image generation processing that generates an area image where a pixel value of a pixel applicable to non-difference in the binary image is set to an area of a region where the pixel is linked and a pixel value of a pixel applicable to difference in the binary image is set to a given value, motion vector identifying processing that identifies a motion vector candidate with which a pixel value of a corresponding pixel in the area image is the largest as a motion vector with respect to each pixel in the interpolation frame, and pixel value determination processing that determines a pixel value based on a pixel in said one frame and a pixel in said another frame specified by a motion vector identified by the motion vector identifying processing with respect to each pixel in the interpolation frame.

ADVANTAGEOUS EFFECTS

According to the present invention, it is possible to uniquely identify a motion vector for each pixel of an interpolation frame and can identify a motion vector with high accuracy.

BRIEF DESCRIPTION OF DRAWINGS

FIG. 2 is an explanatory view showing a motion vector according to the present invention;

FIG. 3 is an explanatory view showing an example of motion vector candidates;

FIG. 4 is an explanatory view showing another example of motion vector candidates;

FIG. 5 is an explanatory view schematically showing an example of a binary image;

FIG. 6 is an explanatory view showing an area image;

FIG. 7 is an explanatory view showing an example of a binary image in which pixels with a pixel value 0 are linked obliquely;

EXPLANATION OF REFERENCE

301 MOTION VECTOR CANDIDATE SELECTION UNIT
302 DIFFERENTIAL IMAGE GENERATION UNIT
303 BINARY IMAGE GENERATION UNIT
304 AREA IMAGE GENERATION UNIT
305 MOTION VECTOR IDENTIFYING UNIT
306 PIXEL VALUE DETERMINATION UNIT

BEST MODE FOR CARRYING OUT THE INVENTION

An embodiment of the present invention is described hereinafter with reference to the drawings.

Figure 1:
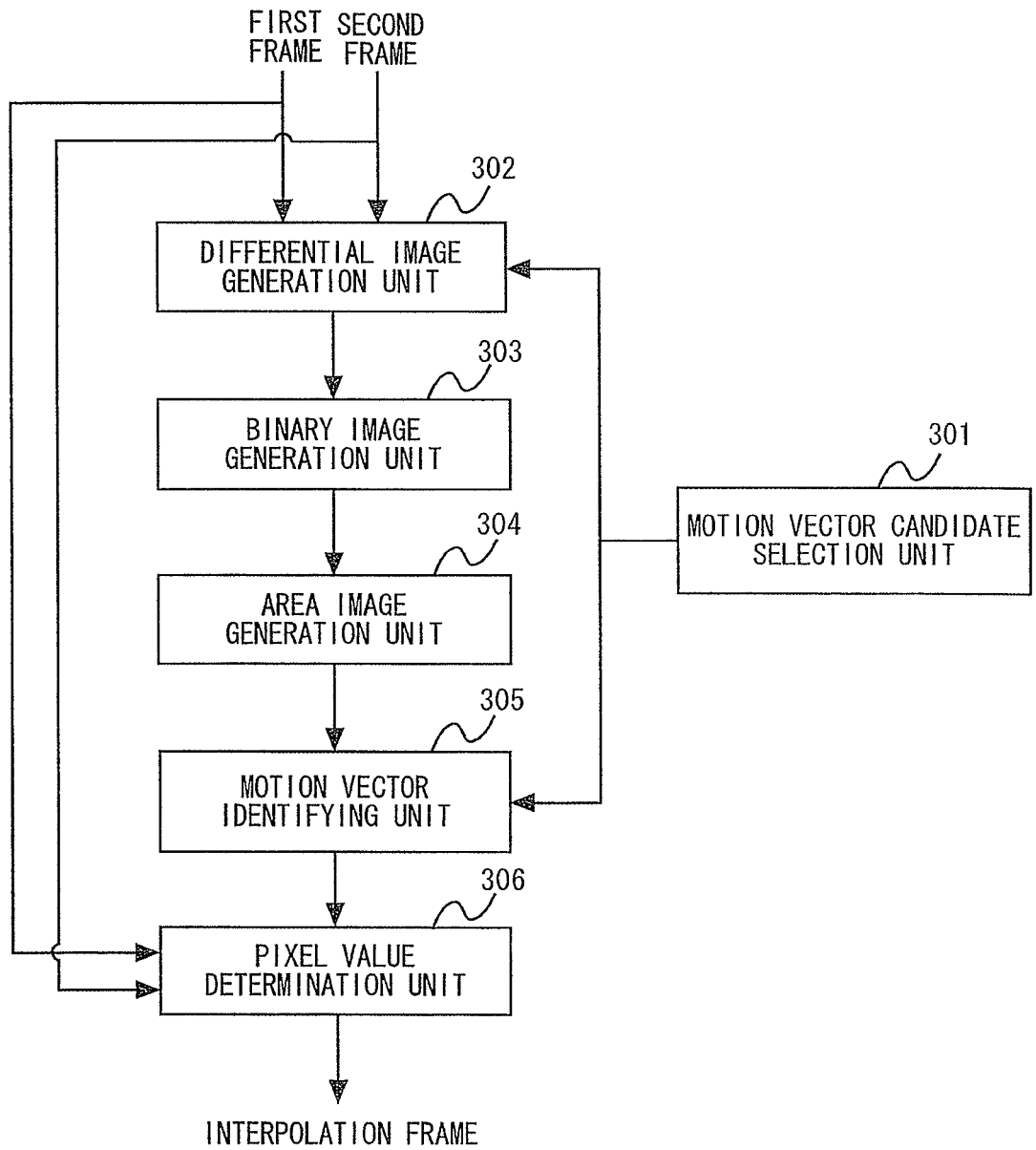
FIG. 1 is a block diagram showing an example of an image processing system according to the present invention.

FIG. 1 is a block diagram showing an example of an image processing system according to the present invention. The image processing system according to the present invention includes a motion vector candidate selection unit 301, a differential image generation unit 302, a binary image generation unit 303, an area image generation unit 304, a motion vector identifying unit 305, and a pixel value determination unit 306.

Consecutive frames for displaying a motion picture are input to the image processing system according to the present invention. Then, the image processing system generates an interpolation frame to be inserted between the input two consecutive frames. The image processing system generates an interpolation frame by determining the pixel value of the interpolation frame.

In the following description, the case where each input frame is a gray-scale image and the pixel value of the pixel of each input frame is a luminance value indicating luminance is described by way of illustration.

The motion vector candidate selection unit 301 selects candidates one after another from a plurality of predetermined motion vector candidates. For example, the motion vector candidates are stored in memory (not shown) included in the image processing system, and the motion vector candidate selection unit 301 may select motion vector candidates one after another.

The motion vector according to the present invention is described hereinbelow. FIG. 2 is an explanatory view showing a motion vector according to the present invention. In FIG. 2, the y-axis of frames is omitted. The motion vector according to the present invention is a vector that indicates a motion from a pixel 62 in an interpolation frame 52 to a pixel 61 in a second frame (the subsequent frame in the two consecutive frames) 51. Specifically, the motion vector is a vector that starts at a pixel in the interpolation frame 52 and ends at a pixel in the second frame. In FIG. 2, a motion vector 71 is indicated by a full-line arrow. An inverse vector 72 of the motion vector 71 is a vector from the pixel 62 in the interpolation frame 52 to a pixel 60 in a first frame (the preceding frame in the two consecutive frames) 50.

When the motion vector 71 is specified for the pixel 62 in the interpolation frame 52, the pixel 61 in the second frame 51 is specified and also the inverse vector 72 of the motion vector 71 is specified, so that the pixel 60 in the first frame 50 is specified. Therefore, if one motion vector 71 is specified for the pixel 62 in the interpolation frame 52, the pixels 60 and 61 in the two frames 50 and 51 are specified. Note that it is assumed in this example that an object to be displayed as an image makes a linear uniform motion. Specifically, it is assumed that a part displayed by the pixel 60 makes a linear uniform motion up to the position of the pixel 61 on a screen. Then, the pixel 62 in the interpolation frame 52 corresponds to the position at the midpoint when the part displayed by the pixel 60 moves to the position of the pixel 62. Because frames for displaying a motion picture are switched at high speed, the motion of an object displayed by the two consecutive frames can be regarded as a linear uniform motion.

FIG. 3 is an explanatory view showing an example of candidates for a motion vector. FIG. 3(a) schematically shows a plurality of candidates for a motion vector. A pixel 81 at the center shown in FIG. 3(a) is a pixel on an interpolation frame. Although eight vectors are illustrated in FIG. 3(a), the motion vector may be a zero vector. When a part displayed, by the pixel 81 does not move in a display screen, the motion vector is a zero vector. FIG. 3(b) shows elements of the respective motion vectors shown in FIG. 3(a). As shown in FIG. 3(b), the motion vector is represented by the x-component and the y-component. For example, the motion vector (0, 0) means that a part displayed by the pixel 81 in the interpolation frame does not move even after switching to the second frame. For example, the motion vector (−1, −1) means that a part displayed by the pixel 81 in the interpolation frame moves to a pixel where the x-coordinate is smaller by 1 and the y-coordinate is smaller by 1 than the pixel 81 when switching to the second frame. The same applies to the other motion vectors shown in FIG. 3(b).

Although nine motion vector candidates including a zero vector are shown in FIG. 3, a combination of motion vector candidates is not limited to the example shown in FIG. 3. For example, as shown in FIG. 4(a), it may be a set of vectors indicating motions from the center of pixels arranged in five rows by five columns to the respective pixels arranged in five rows by five columns. Although the case of five rows by five columns is shown in FIG. 4(a), it may be a set of vectors indicating motions from the center pixel to the respective pixels arranged in n rows by n columns. Further, as shown in FIG. 4(b), it may be a set of vectors indicating motions from the center pixel to some pixels of the pixels arranged in n rows by n columns. Further, if the input consecutive frames represent images that move only in the horizontal direction, the y-coordinates of motion vectors may be all zero. A combination of motion vector candidates may be determined in advance depending on the maximum moving distance or the moving direction of an image between the input two consecutive frames:

Because a candidate for a motion vector can be regarded as indicating an offset from a pixel at the origin of the motion vector, each motion vector candidate is referred to as an offset signal in the following description.

The motion vector candidate selection unit 301 selects offset signals one after another from a plurality of predetermined offset signals. Hereinafter, the offset signal (motion vector candidate) is represented by (u, v), where the x-component of the offset signal is u and the y-component is v.

The differential image generation unit 302 calculates a difference between a pixel in the first frame and a pixel in the second frame which are specified by a pixel in the interpolation frame and the offset signal selected by the motion vector candidate selection unit 301. Then, the differential image generation unit 302 generates a differential image to which the calculated difference is assigned as a pixel value at the same coordinates as the pixel in the interpolation frame.

The differential image has pixels at the same coordinates as the coordinates of the respective pixels in the interpolation frame. The pixel value of each pixel in the differential image is a difference between pixels of the first frame and the second frame which are specified by a pixel in the interpolation frame and a offset signal.

When the coordinates of a pixel in the interpolation frame is (x, y), the pixel value of a pixel at the coordinates (x, y) in the differential image is represented by S(x, y). When the offset signal (u, v) is selected, the differential image generation unit 302 specifies the pixel value of each pixel in the differential image by calculation of the following Equation (1) with respect to each pixel in the interpolation frame.

$$S(x,y) = |It+1(x+u, y+v) - It(x-u, y-v)|$$ Equation (1)

It+1(x+u, y+v) is the luminance value of a pixel at the coordinates (x+u, y+v) in the second frame. Further, It(x−u, y−v) is the luminance value of a pixel at the coordinates (x−u, y−v) in the first frame.

It is assumed that the coordinates of the pixel 62 in the interpolation frame 52 shown in FIG. 2 is (x, y). It is also assumed that a certain offset signal (u, v) is selected as a candidate for the motion vector 71. Then, the coordinates of the pixel 61 in the second frame 51 specified by the pixel 62 and the offset signal (u, v) are (x+u, y+v). Further, the coordinates of the pixel 60 in the first frame 50 specified by the pixel 62 and the offset signal (u, v) are (x−u, y−v). In this manner, the pixels 60 and 61 are specified by the pixel 62 in the interpolation frame 52 and the offset signal (u, v). The right side of Equation (1) is the absolute value of a difference in the luminance value between the pixel 61 in the second frame 51 and the pixel 60 in the first frame 50 which are specified by the pixel 62 in the interpolation frame 52 and the offset signal (u, v). The differential image generation unit 302 sets the value as the pixel value of the coordinates (x, y) in the differential image.

The motion vector candidate selection unit 301 selects offset signals one by one from a plurality of predetermined offset signals. If the selected offset signal is in line with a change from the image of the first frame to the image of the second frame, the pixels 60 and 61 represent the same part in the image, and therefore a difference in the luminance value between the pixels 60 and 61 is ideally 0. Note that, in practice, even if the pixels 60 and 61 represent the same part in the image, it is not completely 0 in some cases due to the effect of noise or the like. On the other hand, if the selected offset signal is not in line with an actual change in the image, the pixels 60 and 61 respectively represent different parts in the image, and a difference in the luminance value between the pixels 60 and 61 is large.

The differential image generation unit 302 performs calculation of Equation (1) with respect to each pixel in the interpolation frame and determines the pixel value in the differential image at the same coordinates as the pixel, thereby generating the differential image.

Further, the differential image generation unit 302 initializes the pixel values of all pixels in a reliability image that stores the reliability of the selected offset signals to 0. The reliability image has pixels at the same coordinates as the coordinates of the respective pixels in the interpolation frame. When the coordinates of a pixel in the interpolation frame is (x, y), the pixel value of a pixel at the coordinates (x, y) in the reliability image is represented by R(x, y). In the reliability image, the largest value of the reliability of each offset signal in the pixel (x, y) in the interpolation frame is stored as the pixel value R(x, y).

Further, the differential image generation unit 302 initializes the pixel values of all pixels in a motion vector image. The motion vector image is an image that stores the component of a motion vector (specifically, an offset signal with the highest reliability). Because the components of a motion vector are the x-component and the y-component, two kinds of motion vector images are prepared. In order to distinguish between them, an image to store the x-component is referred to as an x-component motion vector image, and an image to store the y-component is referred to as a y-component motion vector image. The two kinds of motion vector images have pixels at the same coordinates as the coordinates of the respective pixels in the interpolation frame. When the coordinates of a pixel in the interpolation frame is (x, y), the pixel value of a pixel at the coordinates (x, y) in the x-component motion vector is represented by U(x, y), and the pixel value of a pixel at the coordinates (x, y) in the y-component motion vector is represented by V(x, y). The x-component of the offset signal with the highest reliability in the pixel (x, y) of the interpolation frame is stored in U(x, y), and the y-component of the offset signal is stored in V(x, y).

The binary image generation unit 303 generates a binary image in which the differential image generated by the differential image generation unit 302 is binarized with a threshold. The threshold is set to a certain value. The pixel value of a pixel at the coordinates (x, y) in the binary image is represented by B(x, y). When the pixel value S(x, y) of the differential image is larger than the threshold, the binary image generation unit 303 sets the pixel value of a pixel in the binary image which corresponds to the pixel to 1. On the other hand, when the pixel value S(x, y) of the differential image is equal to or smaller than the threshold, it sets the pixel value of a pixel in the binary image which corresponds to the pixel to 0. The binary image generation unit 303 performs the processing for each pixel and thereby generates a binary image. Thus, the pixel value of the binary image is represented as the following Equation (2). In Equation (2), thresh indicates a threshold.

Equation (2)

$$B(x, y) = \begin{cases} 1 & \text{if } S(x, y) > \text{thresh} \\ 0 & \text{else} \end{cases} \quad \text{Equation (2)}$$

FIG. 5 is an explanatory view schematically showing an example of the binary image. "1" and "0" shown in FIG. 5 indicate the pixel values of the respective pixels. In the binary image generated by the binary image generation unit 303, a pixel with B(x, y)=0 is a pixel that is applicable to "non-difference". Specifically, it is a pixel that corresponds to a part where it is regarded that no difference occurs in the differential image. On the other hand, a pixel with B(x, y)=1 is a pixel that is applicable to "difference". Specifically, it is a pixel that corresponds to a part where it is regarded that a difference occurs in the differential image.

The area image generation unit 304 generates an area image by referring to the binary image generated by the binary image generation unit 303. The area image is an image in which the pixel value of a pixel applicable to "non-difference" among the pixels of the binary image is set to the area of a region where the pixel (the pixel applicable to "non-difference") is linked, and the pixel value of a pixel applicable to "difference" among the pixels of the binary image is set to a predetermined value. The predetermined value may be a value smaller than the minimum value of the area of the pixels applicable to "non-difference". Hereinafter, the case where the area of a region where the pixels applicable to "non-difference" are linked is represented by the number of linked pixels, and the predetermined value is 0 is described by way of illustration.

The area image has pixels at the same coordinates as the coordinates of the respective pixels in the interpolation frame. When the pixel value of a pixel at the coordinates (x, y) in the area image is A(x, y), if B(x, y)=0, the area of a region which includes the relevant pixel at the coordinates (x, y) and in which the pixels with B(x, y)=0 are linked is set to A(x, y). If B(x, y)=1, on the other hand, A(x, y)=0.

FIG. 6 is an explanatory view showing an area image generated based on the binary image illustrated in FIG. 5. The pixels of the area image shown in FIG. 6 respectively correspond to the pixels of the binary image shown in FIG. 5. In the binary image, the pixel value of a region 92 is 0. The area of the region 92 where the pixels with a pixel value of 0 are linked is 6 (cf. FIG. 5). Thus, in the area image, the pixel values of the respective pixels at the same coordinates as the pixels in the region 92 are 6 (cf. FIG. 6). Likewise, the pixel values of the respective pixels at the same coordinates as the pixels in a region 94 in the binary image are 4 (cf. FIGS. 5 and 6). Further, the pixel values of the respective pixels in regions 91 and 93 in the binary image are 1 (cf. FIG. 5). Thus, in the area image, the pixel values of the respective pixels at the same coordinates as the pixels in the regions 91 and 93 are 0.

The state where the pixels with a pixel value of 0 are linked is the state where the pixels with a pixel value of 0 are arranged in a row in the vertical, horizontal, or diagonal direction, for example. Alternatively, the state where the pixels with a pixel value of 0 are arranged in a row vertically or horizontally may be defined as the state where the pixels with a pixel value of 0 are linked. For example, it is assumed that the binary image in the state shown in. FIG. 7 is obtained. If the state where the pixels with a pixel value of 0 are arranged in a row in the vertical, horizontal, or diagonal direction is defined as the state where the pixels with a pixel value of 0 are linked, the area of the region where the pixels with a pixel value of 0 are linked is 5. Further, if the state where the pixels with a pixel value of 0 are arranged in a row vertically or horizontally is defined as the state where the pixels with a pixel value of 0 are linked, there are five regions having the area 1. The definition of the state where the pixels with a pixel value of 0 are linked may be any one of them. If a row in the diagonal direction is included in the linked state, it is possible to improve the interpolation accuracy. On the other hand, if a row in the diagonal direction is not included in the linked state, it is possible to reduce the load of the area image generation processing.

The pixel value A(x, y) of each pixel in the area image is the reliability of the selected offset signal at the coordinates (x, y).

The motion vector identifying unit 305 specifies, with respect to each pixel of the interpolation frame, an offset signal with which the pixel value of a pixel in the area image corresponding to the pixel in the interpolation frame is the largest as a motion vector. Specifically, with respect to each pixel of the interpolation frame, an offset signal with the highest reliability is specified as a motion vector.

Specifically, when the area image is generated, the motion vector identifying unit 305 determines whether the largest value of the pixel value A(x, y) of each pixel in the area image is updated or not. Then, when the pixel value A(x, y) in the area image is updated, it specifies the offset signal being selected during the area image generation as a motion vector of a pixel in the interpolation frame at the same coordinates as the coordinates (x, y) of the pixel. In this manner, the motion vector identifying unit 305 updates the motion vector of the pixel at the coordinates (x, y) in the interpolation frame when the largest value of A(x, y) is updated, thereby specifying a motion vector with the highest reliability with respect to each pixel in the interpolation frame.

In this embodiment, the motion vector identifying unit 305 performs the above processing by using the reliability image, the x-component motion vector image, and the y-component motion vector image. Specifically, it compares R(x, y) and A(x, y) with respect to each coordinates. Then, on condition that R(x, y)<A(x, y), the motion vector identifying unit 305 updates R(x, y), U(x, y) and V(x, y) as in the following Equation (3), Equation (4), and Equation (5). Note that u and v are the x-component and the y-component of the offset signal being selected at the time of generating the area image.

$$R(x,y)=A(x,y) \quad \text{Equation (3)}$$

$$U(x,y)=u \quad \text{Equation (4)}$$

$$V(x,y)=v \quad \text{Equation (5)}$$

All offset signals are sequentially selected, and U(x, y) and V(x, y) that are obtained finally are the x-component and the y-component of the motion vector in a pixel at the coordinates (x, y) in the interpolation frame.

When the motion vector of each pixel in the interpolation frame is identified, the pixel value determination unit 306 determines a pixel value for each pixel in the interpolation frame based on a pixel in the first frame and a pixel in the second frame which are specified by the motion vector identified by the motion vector identifying unit 305. The pixel of the first frame and the pixel of the second frame which are specified by a certain pixel in the interpolation frame and the motion vector of the pixel represent the same part in the image. Thus, a pixel value can be specified so that the relevant pixel of the interpolation frame also represents the same part. In this embodiment, the pixel value determination unit 306 calculates the average value of the luminance values of the pixel in the first frame and the pixel in the second frame which are specified by the pixel in the interpolation frame and the motion vector, and sets the average value as the pixel value of the relevant pixel in the interpolation frame. Specifically, the pixel value determination unit 306 determines the pixel value (the luminance value in this embodiment) of each pixel in the interpolation frame by performing calculation of the following Equation (6) with respect to each pixel in the interpolation frame.

$$I(x,y)=\{It+1(x+U(x,y),y+V(x,y))+It(x-U(x,y),y-V(x,y))\}/2 \quad \text{Equation (6)}$$

In Equation (6), I(x, y) is the pixel value (luminance value) of a pixel at the coordinates (x, y) of the interpolation frame. Further, (x+U(x, y), y+V(x, y)) is the coordinates specified by the coordinates (x, y) and the motion vector (U(x, y), V(x, y)), and, specifically, the coordinates obtained by shifting the coordinates (x, y) by the amount of the motion vector. It+1 (x+U(x, y), y+V(x, y)) is the luminance value of a pixel at the coordinates in the second frame. Likewise, (x−U(x, y), y−V (x, y)) is the coordinates specified by the coordinates (x, y) and the motion vector (U(x, y), V(x, y)), and, specifically, the coordinates obtained by shifting the coordinates (x, y) by the amount of the inverse vector of the motion vector. It(x−U(x, y), y−V(x, y)) is the luminance value of a pixel at the coordinates in the first frame.

The pixel value determination unit 306 generates the interpolation frame by determining the luminance value of each pixel in the interpolation frame.

The motion vector candidate selection unit 301, the differential image generation unit 302, the binary image generation unit 303, the area image generation unit 304, the motion vector identifying unit 305 and the pixel value determination unit 306 are implemented by a CPU that operates according to a program (image processing program), for example. Note that the program is stored in a storage device (not shown) included in the image processing system, for example. The CPU reads the program and operates as the motion vector candidate selection unit 301, the differential image generation unit 302, the binary image generation unit 303, the area image generation unit 304, the motion vector identifying unit 305 and the pixel value determination unit 306 according to the program.

Figure 8:
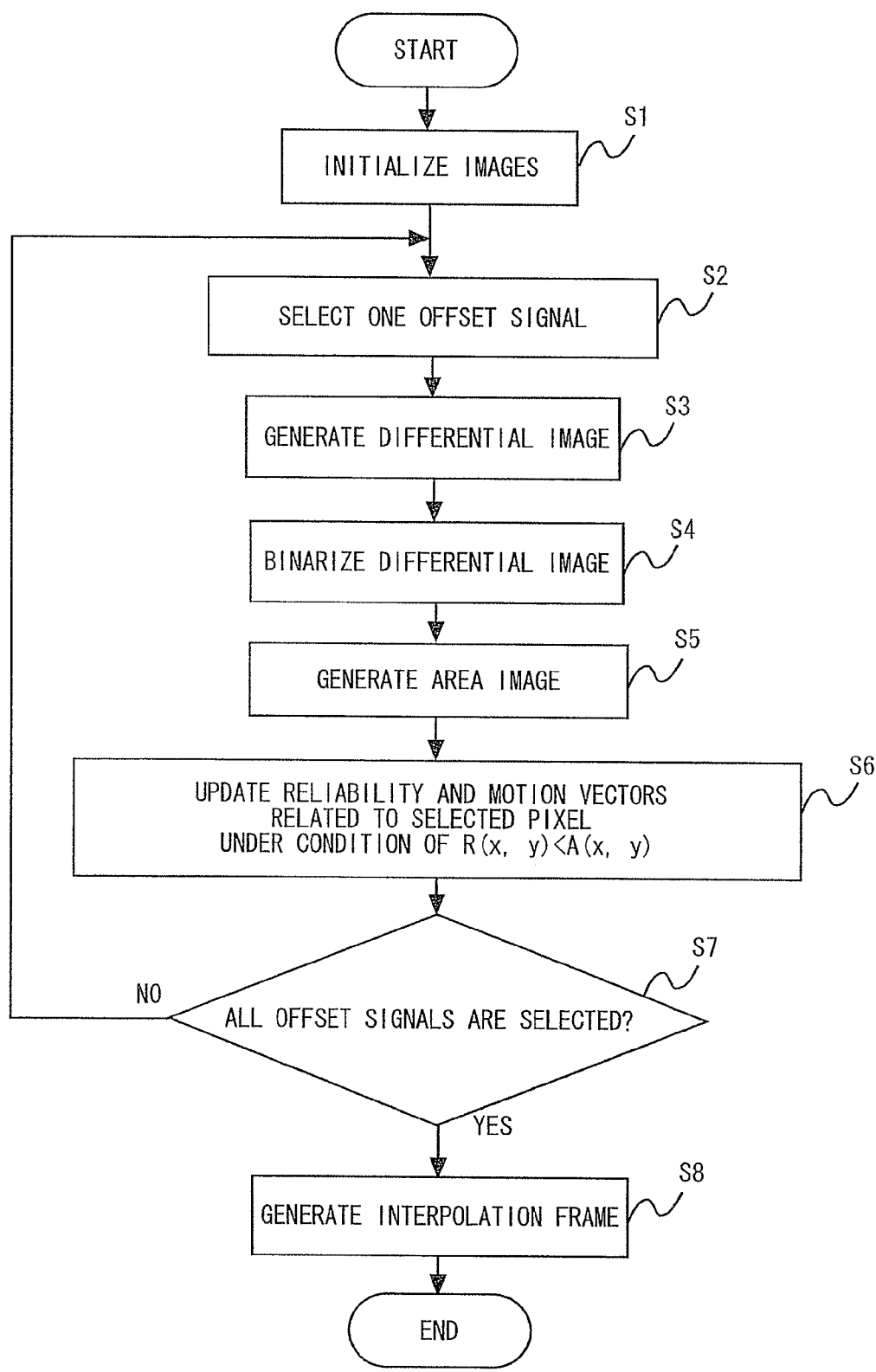
FIG. 8 is an explanatory view showing an example of processing progress of the image processing system according to the present invention.
Figure 9:
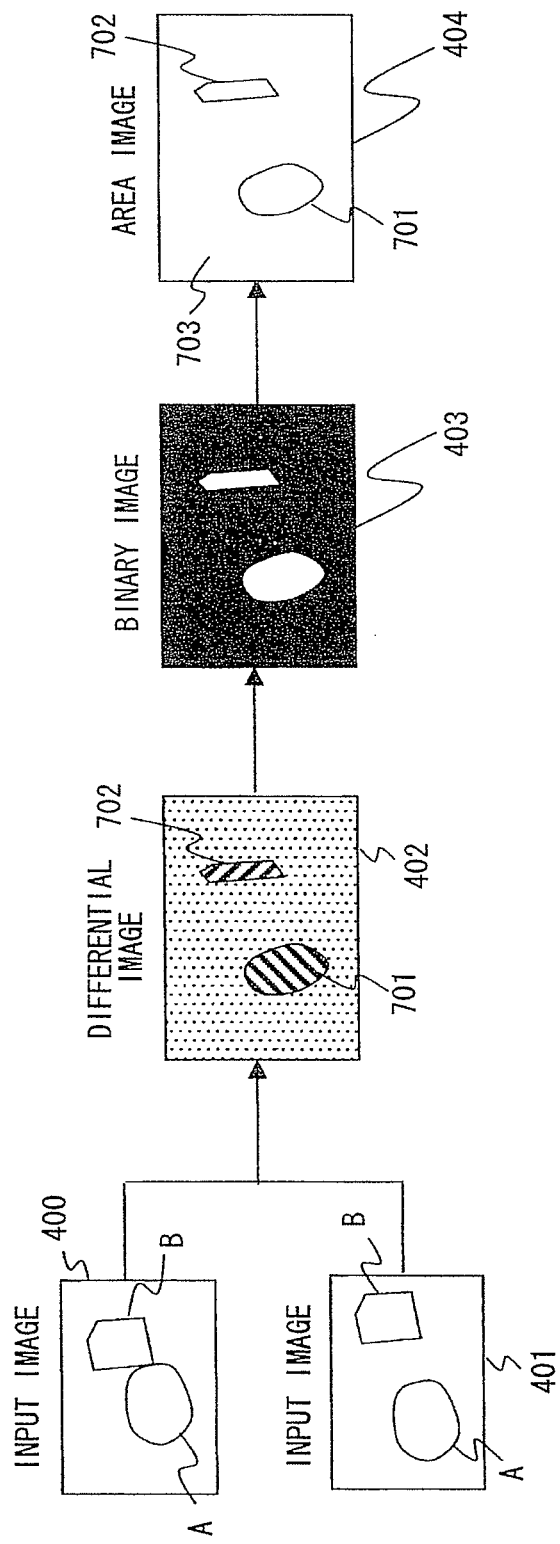
FIG. 9 is a schematic view showing various images generated by processing of the image processing system.

The operation is described hereinbelow. FIG. 8 is an explanatory view showing an example of processing progress of the image processing system according to the present invention. FIG. 9 is a schematic view showing various images generated by processing of the image processing system.

The differential image generation unit 302 initializes the reliability image, the x-component motion vector image, and the y-component motion vector image (Step S1). Specifically, R(x, y)=0, U(x, y)=0, and V(x, y)=0 are set with respect to each coordinates (x, y). Note that the size of input frames (the first frame and the second frame) is fixed, and thus the coordinates of each pixel in the interpolation frame are previously specified.

When two consecutive frames (the first frame and the second frame) are input to the differential image generation unit 302, the differential image generation unit 302 selects one offset signal that is not yet selected from a plurality of prepared offset signals (Step S2).

Then, with respect to each pixel in the interpolation frame, the differential image generation unit 302 calculates the absolute value of a difference in the luminance value between a pixel in the first frame and a pixel in the second frame which are specified by the pixel and the selected offset signal, and generates a differential image whose pixel value is the absolute value of the difference (Step S3). Specifically, if the selected offset signal is (u, v), the differential image generation unit 302 performs calculation represented by Equation (1) with respect to each pixel and generates a differential image whose pixel value is S(x, y).

For example, it is assumed that input images 400 and 401 shown in FIG. 9 are input as the first frame and the second frame. It is further assumed that the consecutive frames 400 and 401 are a motion picture to show the state that objects A and B in the images move to go away. Further, in the first frame and the second frame, the background part other than the objects A and B is in gradations, and the luminance values of the respective pixels in the background part are not uniform. A differential image 402 shown in FIG. 9 shows an example of the differential image generated in Step S3. A region 701 is the region to which the absolute value of a difference between the luminance of a pixel representing the object A in the first frame 400 and the luminance of a pixel representing the object A in the second frame 401 is assigned. A region 702 is the region to which the absolute value of a difference between the luminance of a pixel representing the object B in the first frame 400 and the luminance of a pixel representing the object B in the second frame 401 is assigned. Although the difference between the pixels representing the same object is not always 0 due to the effect of noise or the like, there is no significant difference. Note that, because the luminance of the background part is not uniform in this example, when the two pixels specified by the coordinates (x, y) and the offset signal are both the pixels in the background part, a significant difference occurs except for the case where the offset signal is (0, 0).

After Step S3, the binary image generation unit 303 performs calculation represented by Equation (2) with respect to each coordinates (i.e. with respect to each pixel) and generates a binary image in which the differential image generated in Step S3 is binarized (Step S4). "thresh" indicating the threshold (Equation (2)) may be defined as a value that sets a difference regarded as insignificant to 0 and sets a difference regarded as significant to 1.

In the example shown in FIG. 9, in the binary image 403, the pixels of regions which correspond to the regions 701 and 702 in the differential image 402 are 0, and the pixels of regions which correspond to regions other than the regions 701 and 702 in the differential image 402 are 1.

When the binary image is generated, the area image generation unit 304 generates an area image based on the binary image (Step S5). In Step S5, the area image generation unit 304 refers to the binary image and, with respect to each region where the pixels with a pixel value of 0 are linked, calculates the area of the region. For example, it counts the number of linked pixels with respect to each region where the pixels with a pixel value of 0 are linked. Then, the area image generation unit 304 sets the pixel value of each pixel in the region to the area. Specifically, if B(x, y)=0, the area image generation unit 304 obtains the area (which is referred to as P) of a pixel with a pixel value of 0 which is linked to the coordinates (x, y), and sets A(x, y)=P. Further, the area image generation unit 304 sets A(x, y)=0 for a pixel with a pixel value of 1 in the binary image. In other words, A(x, y)=0 if B(x, y)=1.

In an area image 404 shown in FIG. 9, the pixel value of each pixel in a region 701 is set to the area value of the region 701. Further, the pixel value of each pixel in a region 702 is set to the area value of the region 702. The pixel value of each pixel in the other region 703 is set to 0.

By the processing of Steps S2 to S5, if one offset signal is selected, one area image is generated.

In the case where objects in images move in a motion picture like the objects A and B shown in FIG. 9, if the selected offset signal is in line with the motion in each pixel in the interpolation image, no significant difference occurs between the pixels of the first frame and the second frame which are specified from the pixel in the interpolation image and the offset signal. Further, the number of such pixels becomes closer to the number of pixels representing the objects as the selected offset signal is more in line with the motion in a motion picture, and it becomes closer to 0 if the offset signal is not in line with the motion in a motion picture. Although the objects displayed in a motion picture are described herein, the same applies to the background. Accordingly, the pixel value $A(x, y)$ of each pixel in the area image becomes larger as the offset signal is more in line with the motion of the image. Thus, $A(x, y)$ is the reliability of the offset signal being selected at the coordinates $(x, y)$.

After Step S5, the motion vector identifying unit 305 compares $A(x, y)$ with $R(x, y)$, and, on condition that $R(x, y) < A(x, y)$, it updates the value of $R(x, y)$ to $A(x, y)$, updates the value of $U(x, y)$ to u, and updates the value of $V(x, y)$ to v. u and v are the x-component and the y-component of the offset signal selected in Step S2. The update is not performed for pixels where $R(x, y) < A(x, y)$ is not satisfied. The motion vector identifying unit 305 performs the processing with respect to each coordinates (Step S6).

After Step S6, the motion vector candidate selection unit 301 determines whether all offset signals are already selected or not (Step S7). If there is an offset signal that is not yet selected (No in Step S7), the processing from Step S2 is performed.

Note that, although the motion vector candidate selection unit 301 selects an offset signal each time proceeding to Step S2, the selection sequence of offset signals is not particularly limited. For example, when selecting the offset signals as illustrated in FIG. 3(*b*), the motion vector candidate selection unit 301 may make a selection in the sequence of raster scan. Alternatively, it may select offset signals in the sequence of slow-moving, centering on the zero vector (0, 0) indicating "no motion".

When all offset signals are already selected (Yes in Step S7), the process proceeds to Step S8. At this time, $U(x, y)$ and $V(x, y)$ specified for each pixel are the x-component and the y-component of the motion vector with the highest reliability for the pixel. Thus, the motion vector at the coordinates $(x, y)$ of the interpolation frame is $(U(x, y), V(x, y))$.

In Step S8, the luminance value of each pixel in the interpolation frame is determined by performing the calculation represented by Equation (6) for each pixel in the interpolation frame, thereby generating the interpolation frame (Step S8). In this manner, in the present invention, the pixel value of each pixel in the interpolation frame is individually calculated by using the motion vector which is identified for each pixel of the interpolation frame.

Figure 10:
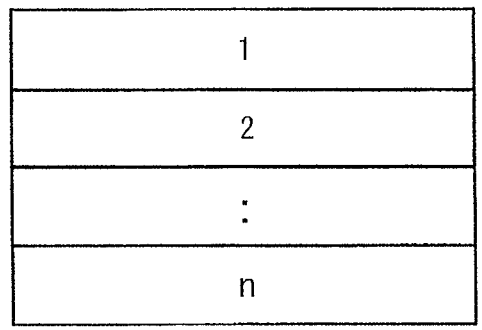
FIG. 10 is an explanatory view showing an example of dividing an entire image (frame) into a plurality of blocks.

Although the case where the processing of Steps S1 to S8 is applied for the entire image is described above, the entire image may be divided into a plurality of blocks in advance, and the processing of Steps S1 to S8 may be applied with respect to each block. Specifically, the first frame and the second frame may be respectively divided into a plurality of blocks in similar fashion, and the processing of Steps S1 to S8 may be executed with respect to each pair of the block of the first frame and the block of the second frame. In this case, the image processing system may include a dividing unit (not shown) that divides each frame into a plurality of blocks. The dividing unit is implemented by a CPU that operates according to a program (image processing program), for example, like the motion vector candidate selection unit 301 or the like. FIG. 10 is an explanatory view showing an example of dividing an entire image (frame) into a plurality of blocks. The dividing unit may divide the first frame and the second frame into n-number of blocks as illustrated in FIG. 10.

Further, although FIG. 10 shows the case of dividing a frame in such a way that the respective blocks do not overlap with one another, it may be divided into blocks so that there is an overlapping region in the blocks. In this case, a plurality of motion vectors are estimated for a pixel that belongs to a plurality of blocks. In this case, the pixel value determination unit 306 may compare the reliability $R(x, y)$ related to the respective motion vectors estimated for one pixel and employ the motion vector with the highest reliability $R(x, y)$ as a motion vector of the pixel, thereby determining the pixel value of the interpolation frame.

Advantageous effects of the present invention are described hereinbelow.

Figure 17:
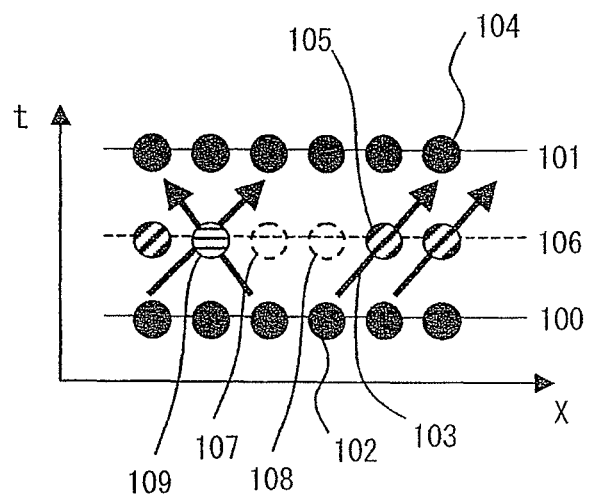
FIG. 17 is an explanatory view showing an example of pixels in an interpolation frame whose pixel values cannot be specified.
Figure 18:
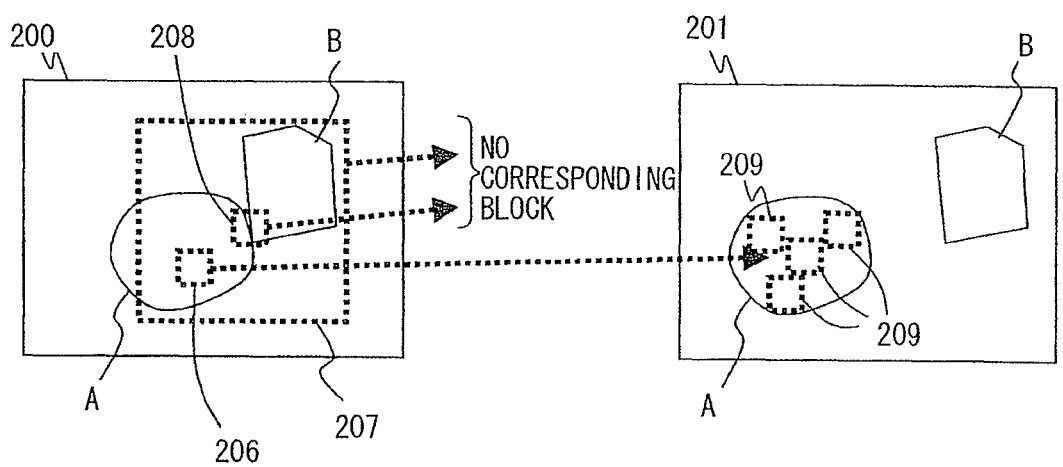
FIG. 18 is an explanatory view showing a case where a motion vector cannot be estimated.

According to the present invention, the motion vector candidate selection unit 301 selects offset signals (motion vector candidates). Then, the differential image generation unit 302, the binary image generation unit 303 and the area image generation unit 304 respectively generate a differential image, a binary image and an area image according to one offset signal. Then, the motion vector identifying unit 305 identifies the offset signal with which the pixel value of a pixel in the area image is the largest as the motion vector with respect to each pixel in the interpolation frame. It is thereby possible to uniquely identify the motion vector for each pixel in the interpolation frame. Specifically, a pixel for which a motion vector is not identified or a pixel which is interpolated from a plurality of directions such as the pixel 109 in FIG. 17 do not exist among the pixels in the interpolation frame, one motion vector can be identified for each pixel.

Figure 11:
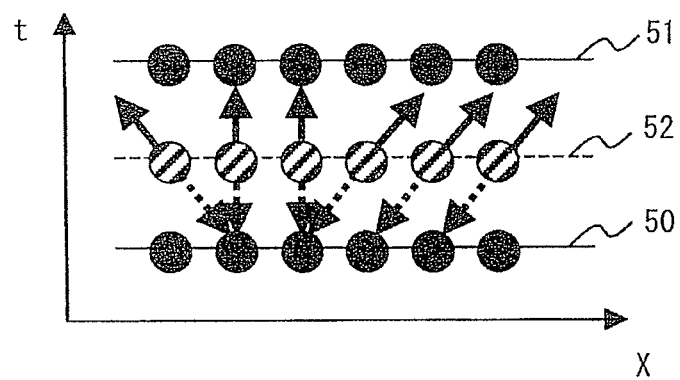
FIG. 11 is an explanatory view showing advantageous effects of the present invention.

FIG. 11 is an explanatory view showing advantageous effects of the present invention. As shown in FIG. 11, a motion vector can be obtained for each pixel on the interpolation frame 52. In FIG. 11, a dotted-line arrow indicates an inverse vector of a motion vector. By specifying a motion vector for each pixel on the interpolation frame 52, a pixel on the second frame 51 and a pixel on the first frame 50 can be specified, and the pixel value of the pixel of the interpolation frame 52 can be calculated from the pixel values of those pixels. In the present invention, because a motion vector can be identified for each pixel of the interpolation frame, it is possible to uniquely specify the pixel value of each pixel.

Further, in the present invention, the offset signal with which a pixel value in the area image is the largest is specified as a motion vector with respect to each coordinates $(x, y)$. Thus, the problems that have occurred in the case of performing the template matching in units of blocks of a certain size (the problems that a motion vector cannot be specified or a block cannot be specified in some cases) do not occur, and it is thus possible to specify a motion vector with high accuracy.

Further, in the present invention, because an interpolation image is inserted between two consecutive frames, it is possible to improve the frame rate of a motion picture. Further, by applying the present invention to a motion picture to be played back in slow motion, it is possible to achieve smooth display of a motion picture in slow-motion playback.

In the above embodiment, the case where each input frame is a gray-scale image, and the pixel value of a pixel of each frame is a luminance value is described. Alternatively, each input frame may be a color image, and the pixel value of a pixel of each frame may be a value of R (red) component, G (green) component, and B (blue) component. The value of the R component is a value representing the gradation of R. The same applies to the G component and the B component.

In this case, the differential image generation unit 302 may obtain the pixel value of each pixel of the differential image by calculation of the following Equation (7) in Step S3. If the coordinates of a given pixel in the second frame is (X, Y), the R component, the G component and the B component of the pixel are referred to as rt+1(X,Y), gt+1(X,Y) and bt+1(X,Y), respectively. Likewise, if the coordinates of a given pixel in the first frame is (X, Y), the R component, the G component and the B component of the pixel are referred to as rt(X,Y), gt(X,Y) and bt(X,Y), respectively.

Equation (7)

$$S(x, y) = |r_{t+1}(x+u, y+v) - r_t(x-u, y-v)| + \\ |g_{t+1}(x+u, y+v) - g_t(x-u, y-v)| + \\ |b_{t+1}(x+u, y+v) - b_t(x-u, y-v)|$$

Equation (7)

Specifically, in Step S3, the differential image generation unit 302 calculates, as S(x, y), the sum of the absolute value of a difference between the R components, the absolute value of a difference between the G components and the absolute value of a difference between the B components, respectively, of a pair of pixels of the first frame and the second frame which are specified by the coordinates (x, y) and the offset signal.

Further, in this case, the pixel value determination unit 306 obtains the R component, the G component and the B component by calculation of the following Equations (8) to (10), respectively, as a pixel value at the coordinates (x, y) of the interpolation frame in Step S8.

$$r(x,y) = \{rt+1(x+U(x,y), y+V(x,y)) + rt(x-U(x,y), y-V(x,y))\}/2 \quad \text{Equation (8)}$$

$$g(x,y) = \{gt+1(x+U(x,y), y+V(x,y)) + gt(x-U(x,y), y-V(x,y))\}/2 \quad \text{Equation (9)}$$

$$b(x,y) = \{bt+1(x+U(x,y), y+V(x,y)) + bt(x-U(x,y), y-V(x,y))\}/2 \quad \text{Equation (10)}$$

r(x, y), g(x, y) and b(x, y) are the R component, the G component and the B component, respectively, of a pixel at the coordinates (x, y) of the interpolation frame Specifically, the pixel value determination unit 306 calculates the average value of the R components, the average value of the G components and the average value of the B components, respectively, of a pair of pixels on the first frame and the second frame which are specified by the coordinates (x, y) and the motion vector as the pixel value of the interpolation frame.

Hereinafter, another embodiment of the present invention is described. In the embodiment described below, information indicating the motion of an entire image (which is referred to hereinafter as global motion information) is obtained first, and a background part and a foreground part of the interpolation frame are separated. Then, the pixel value of the interpolation frame is determined in the same manner as in the first embodiment for the foreground part, and the pixel value of the interpolation frame is determined by using the global motion information for the background part.

Figure 12:
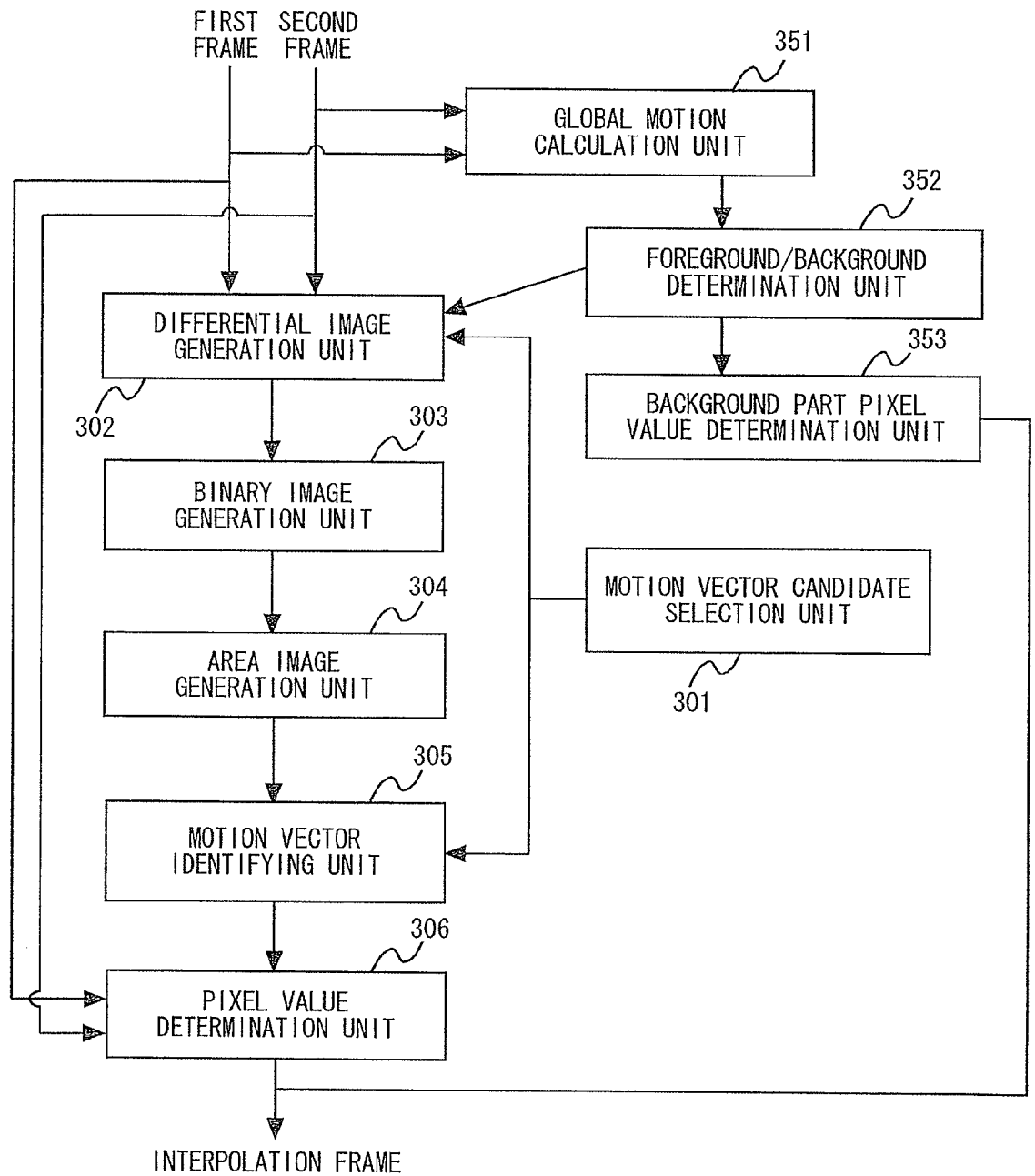
FIG. 12 is a block diagram showing an example of an image processing system according to another embodiment of the present invention.

FIG. 12 is a block diagram showing an example of an image processing system according to the embodiment. The elements that are similar to the elements described earlier are denoted by the same reference symbols as in FIG. 1, and detailed explanation thereof is omitted. The image processing system according to the embodiment includes a motion vector candidate selection unit 301, a differential image generation unit 302, a binary image generation unit 303, an area image generation unit 304, a motion vector identifying unit 305, a pixel value determination unit 306, a global motion calculation unit 351, a foreground/background determination unit 352, and a background part pixel value determination unit 353.

When the first frame and the second frame are input to the global motion calculation unit 351, it identifies global motion information that indicates the motion of an entire image between the first frame and the second frame. As described earlier, the first frame is the preceding frame in the two consecutive frames, and the second frame is the subsequent frame in the two consecutive frames. Therefore, on the basis of the interpolation frame, the first frame can be regarded as a past frame, and the second frame can be regarded as a future frame.

Further, the global motion is the motion of an entire image between consecutive frames, and an example of the global motion is a motion from the left to the right which is observed in the entire image when a camera is panned from the right to the left, a motion radiating out from the image center which is observed when a camera zooms in or the like, for example. Note that pan or zoom in are described as examples, the motion of a camera that causes a global motion is not limited thereto.

The foreground/background determination unit 352 classifies pixels of the interpolation frame into a pixel determined to conform to the global motion of the consecutive frames (the first frame and the second frame) and a pixel not determined to conform to the global motion by using the global motion information. The pixel determined to conform to the global motion can be regarded as a pixel of the background part in the interpolation frame, and the pixel not determined to conform to the global motion can be regarded as a pixel of the foreground part in the interpolation frame.

The motion vector candidate selection unit 301, the differential image generation unit 302, the binary image generation unit 303, the area image generation unit 304, the motion vector identifying unit 305 and the pixel value determination unit 306 perform the processing in Steps S1 to S8 (cf. FIG. 8) in the same way as in the first embodiment only on the pixels that are determined to be the pixels of the foreground part in the interpolation frame by the foreground/background determination unit 352 and thereby determine the pixel value of the foreground part of the interpolation frame.

The background part pixel value determination unit 353 obtains the pixel values of the pixels that are determined to be the pixels of the background part in the interpolation frame by the foreground/background determination unit 352 from the global motion information and the pixel values of the first frame and the second frame. As a result that the pixel values of the pixels of the foreground part and the background part are respectively determined, the interpolation frame can be obtained.

The global motion calculation unit 351, the foreground/background determination unit 352 and the background part pixel value determination unit 353 are implemented by a CPU that operates according to a program (image processing program), for example. Specifically, the CPU may operate as the motion vector candidate selection unit 301, the differential image generation unit 302, the binary image generation unit 303, the area image generation unit 304, the motion vector identifying unit 305, the pixel value determination unit 306, the global motion calculation unit 351, the foreground/background determination unit 352, and the background part pixel value determination unit 353 according to the program.

The operation of the embodiment is described hereinbelow. When the consecutive frames (the first frame and the second frame) are input, the global motion calculation unit 351 calculates global motion information that indicates the global motion of an entire image in the consecutive frames. Hereinafter, the first frame is represented by the symbol T, and the second frame is represented by the symbol "T+1". As a motion model that represents the motion of the entire image, an affine transformation may be used, for example. In the case of using the affine transformation as a motion model, a coordinate transformation from the coordinates (xT, yT) of a pixel on the first frame T to the coordinates (xT+1, yT+1) of a corresponding pixel on the second frame (T+1) is represented by the following Equation (11).

Equation (11):

$$x_{T+1} = a_1 x_T + a_2 y_T + a_3$$

$$y_{T+1} = a_4 x_T + a_5 y_T + a_6 \quad \text{Equation (11)}$$

In the following description, the case of calculating a vector (a1, a2, a3, a4, a5, a6) whose elements are parameters specifying the transformation of Equation (11) as the global motion information is described by way of illustration. Further, the vector (a1, a2, a3, a4, a5, a6) is represented by the symbol a.

Figure 13:
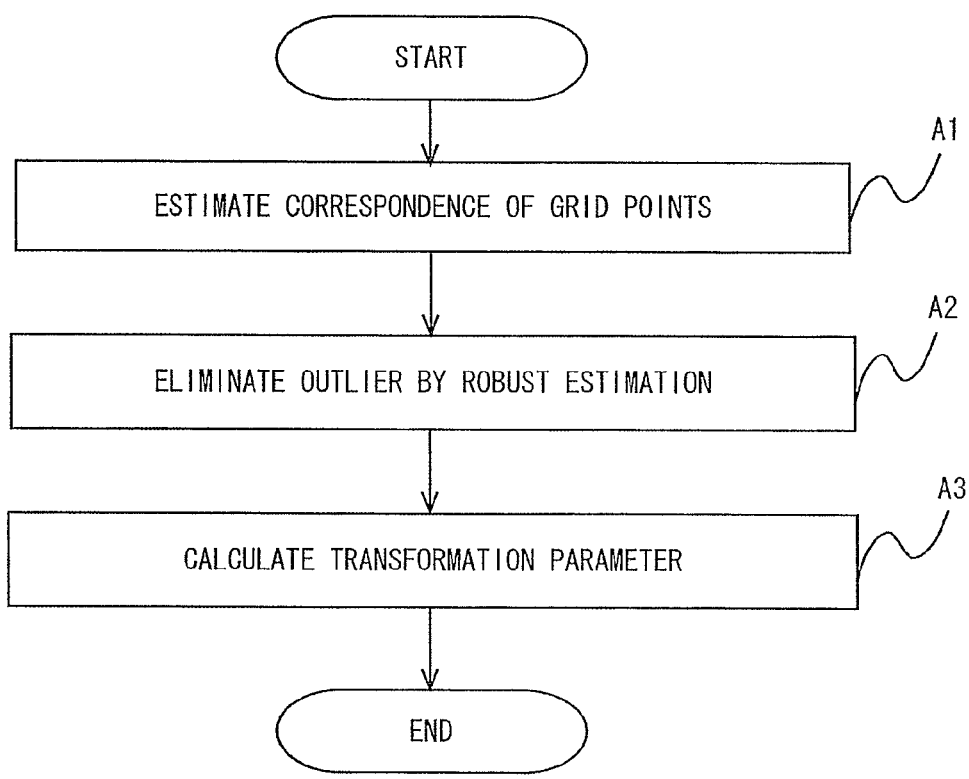
FIG. 13 is a flowchart showing an example of processing that calculates global motion information in a global motion calculation unit.

FIG. 13 is a flowchart showing an example of processing that calculates the global motion information (the vector a) in the global motion calculation unit 351. The global motion calculation unit 351 divides the first frame and the second frame into blocks, performs template matching for each block, and identifies the correspondence between blocks (Step A1). Specifically, it identifies the correspondence between grid coordinates by performing the template matching. The pixel at the center of each block is referred to as a grid point, and the grid coordinates are the coordinates of the grid point.

Figure 14:
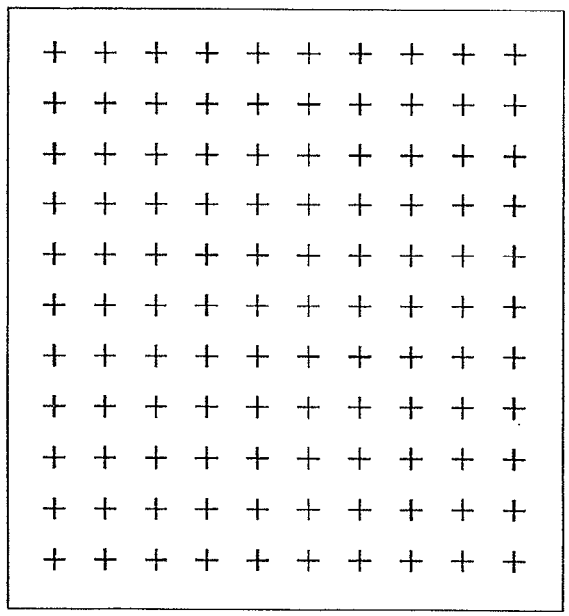
FIG. 14 is an explanatory view showing an example of grid points when a frame is divided into square blocks.
Figure 15:
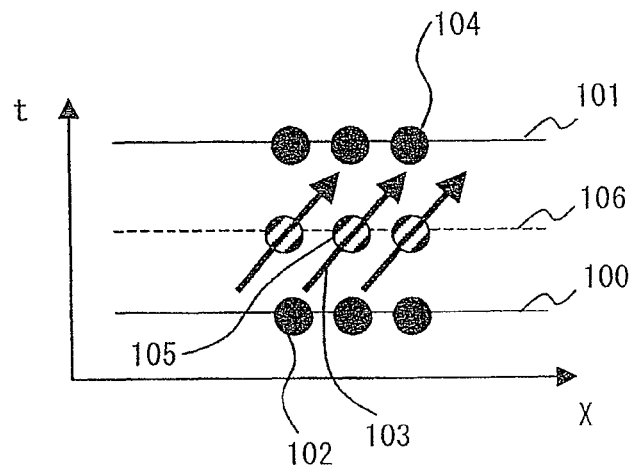
FIG. 15 is an explanatory view showing an interpolation frame generated in general interpolation frame generation processing.
Figure 16:
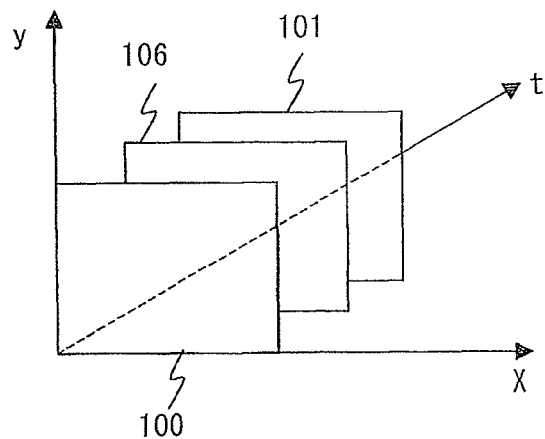
FIG. 16 is an explanatory view showing two frames and an interpolation frame.

In Step A1, the global motion calculation unit 351 may perform the template matching by dividing the first frame and the second frame into square blocks, for example. FIG. 14 shows an example of grid points when the frame is divided into square blocks. "+" in FIG. 14 indicates a grid point (the center pixel in each block). The global motion calculation unit 351 obtains the absolute value of a difference between the corresponding pixels in the blocks with respect to each pair of the block of the first frame and the block of the second frame, and calculates the sum of the absolute values (SAD: Sum of Absolute Difference) in the whole blocks. Then, it associates a block of one frame (the first frame) with a block with the minimum SAD among blocks of the other frame. At this time, the grid coordinates of the blocks are associated with each other. The blocks are more similar as the SAD value is smaller. Note that the size of the block may be a previously specified fixed size, for example. Alternatively, template matching may be performed for a plurality of sizes (e.g. a plurality of sizes such as large, medium and small). In the case of using blocks of a plurality of sizes, because the SAD value is larger as the block size is larger, the SAD value is divided by the number of pixels in the block, and the degree of similarity between blocks may be evaluated based on the division result.

The way of specifying the grid point may be different from setting the center of a square grid as the grid point. For example, the grid coordinates on an image may be specified adaptively by searching for the point at which edges intersect on the image by using Harris Corner Detector or the like.

After Step A1, the global motion calculation unit 351 detects false correspondence of grid points as an outlier by RANSAC (Random Sample Consensus) algorithm, and excludes the grid point detected as false correspondence (Step A2). For example, the grid point on the first frame side in a pair of grid points as false correspondence is excluded from the list of grid points of the first frame.

An example of Step A2 is described hereinbelow. The global motion calculation unit 351 selects three pairs from pairs of grid points for which correspondence is specified in Step A1. In the three pairs of grid points, three grid coordinates in the first frame are referred to as (x1T, y1T), (x2T, y2T) and (x3T, y3T), and three grid coordinates in the second frame are referred to as (x1T+1, y1T+1), (x2T+1, y2T+1) and (x3T+1, y3T+1). Note that 1, 2 and 3 shown at the upper right of the symbol of the coordinates are superscripts respectively indicating the first, the second and the third. After selecting the three pairs, the global motion calculation unit 351 solves the following Equation (12) with respect to the vector a with the vector a=(a1, a2, a3, a4, a5, a6) variables.

Equation (12)

$$\begin{pmatrix} x_{T+1}^1 \\ y_{T+1}^1 \\ x_{T+1}^2 \\ y_{T+1}^2 \\ x_{T+1}^3 \\ y_{T+1}^3 \end{pmatrix} = \begin{pmatrix} x_T^1 & y_T^1 & 1 & 0 & 0 & 0 \\ 0 & 0 & 0 & x_T^1 & y_T^1 & 1 \\ x_T^2 & y_T^2 & 1 & 0 & 0 & 0 \\ 0 & 0 & 0 & x_T^2 & y_T^2 & 1 \\ x_T^3 & y_T^3 & 1 & 0 & 0 & 0 \\ 0 & 0 & 0 & x_T^3 & y_T^3 & 1 \end{pmatrix} a \quad \text{Equation (12)}$$

Solving Equation (12) with respect to the vector a means solving the simultaneous equations where a1, a2, a3, a4, a5 and a6 are variables. After Equation (12) is solved with respect to a1, a2, a3, a4, a5 and a6, the global motion calculation unit 351 substitutes a1, a2, a3, a4, a5 and a6 into Equation (11) and thereby transform the respective grid coordinates in the first frame. The global motion calculation unit 351 obtains the distance between the coordinates after transformation and the coordinates in the second frame associated with the respective grid coordinates in the first frame, and when the distance between the coordinates is equal to or larger than a threshold, it determines the grid coordinates in the first frame as an outlier. The threshold may be determined in advance. Then, the global motion calculation unit 351 counts the number of grid coordinates in the first frame which are determined as outliers. The count result is N. In this manner, the number of outliners in the case of setting three pairs of corresponding grid points is counted.

The global motion calculation unit 351 repeats the processing that selects three pairs of grid points and counts the number N of outliers in the same manner. In the repeated processing, three combinations may be all-inclusively selected from pairs of grid points specified in Step A1. Specifically, the processing may be performed repeatedly until selecting all of combinations for selecting three pairs from pairs of grid points specified in Step A1. Alternatively, conditions may be set for three pairs to be selected. For example, three pairs that satisfy the condition that the distance between the coordinates of the first frame (or the second frame) is a given distance or longer may be selected, and the processing may be performed repeatedly until all of the three pairs that satisfy the condition are selected.

After the processing that selects three pairs of grid points and counts the number N of outliers is performed repeatedly, and the repeated processing ends, an outlier when the number N of outliers is the smallest is determined as the outliner to cause false correspondence, and the outliner is excluded from the list of grid coordinates of the first frame.

After Step A2, the global motion calculation unit 351 obtains affine transformation parameters a1, a2, a3, a4, a5 and a6 by using all the grid coordinates remaining in the list of grid coordinates of the first frame (i.e. all the grid coordinates that are not eliminated in Step A2) (Step A3). The respective grid coordinates that are not eliminated in Step A2 among the grid coordinates of the first frame are (x1T, y1T), (x2T, y2T), . . . , (xnT, ynT). Not that 1, 2, . . . , n shown at the upper right of the symbol of the coordinate values are superscripts indicating the sequence of the coordinates. n is the total number of grid points that are not eliminated as outliers in Step A2. In Step A1, the grid coordinates of the second frame that are associated with the respective grid coordinates (x1T, y1T), (x2T, y2T), . . . , (xnT, ynT) are (x1T+1, y1T+1), (x2T+1, y2T+1), . . . , (xnT+1, ynT+1). The global motion calculation unit 351 solves the following Equation (13) with respect to the vector a (i.e. the affine transformation parameters a1 to a6).

Equation (13)

$$\begin{pmatrix} x^1_{T+1} \\ y^1_{T+1} \\ x^2_{T+1} \\ y^2_{T+1} \\ \vdots \\ \vdots \\ x^n_{T+1} \\ y^n_{T+1} \end{pmatrix} = \begin{pmatrix} x^1_T & y^1_T & 1 & 0 & 0 & 0 \\ 0 & 0 & 0 & x^1_T & y^1_T & 1 \\ x^2_T & y^2_T & 1 & 0 & 0 & 0 \\ 0 & 0 & 0 & x^2_T & y^2_T & 1 \\ & & \vdots & & & \\ & & \vdots & & & \\ x^n_T & y^n_T & 1 & 0 & 0 & 0 \\ 0 & 0 & 0 & x^n_T & y^n_T & 1 \end{pmatrix} a$$

Equation (13)

Generally, because n has a value of 3 or greater, the number of equations (constraint conditions) is 6 or greater while the degree of freedom of a solution to be obtained (vector a) is 6. Thus, a problem to solve Equation (13) is over-constrained. In this case, the global motion calculation unit 351 may solve the vector a as a least squares problem. In other words, the elements a1 to a6 of the vector a may be solved by a least squares method.

The vector a=(a1, a2, a3, a4, a5, a6) obtained by solving Equation (13) corresponds to the global motion information.

As described above, after the global motion calculation unit 351 obtains the global motion information (a1, a2, a3, a4, a5, a6), the foreground/background determination unit 352 classifies the pixels of the interpolation frame into the pixels of the background part and pixels of the foreground part. The classification processing is described hereinbelow.

The interpolation frame that is interpolated between the first frame T and the second frame (T+1) is represented by "T+0.5". The coordinates of a pixel on the interpolation frame (T+0.5) is (xT+0.5, yT+0.5). In the case where the coordinates (xT+0.5, yT+0.5) on the interpolation frame conform to a global motion, i.e. the case of a pixel in the background part, a pixel value IT(xT, yT) at the projected coordinates (xT, yT) on the first frame T and a pixel value IT+1(xT+1, yT+1) at the projected coordinates (xT+1, yT+1) on the second frame (T+1) by the global motion match. On the other hand, in the case where the coordinates (xT+0.5, yT+0.5) on the interpolation frame do not conform to a global motion, i.e. the case of a pixel in the foreground part, IT(xT, yT) and IT+1(xT+1, yT+1) do not match. Note that the projected coordinates (xT, yT) on the first frame T by the global motion is the coordinates in the first frame which correspond to the coordinates (xT+0.5, yT+0.5) of the interpolation frame under the global motion. Likewise, the projected coordinates (xT+1, yT+1) on the second frame (T+1) by the global motion is the coordinates in the second frame which correspond to the coordinates (xT+0.5, yT+0.5) of the interpolation frame under the global motion.

With respect to each coordinates (pixel) in the interpolation frame, the foreground/background determination unit 352 calculates the absolute value of a difference between the pixel value of the projected coordinates on the first frame T and the pixel value of the projected coordinates on the second frame (T+1) by the global motion. When the absolute value of the difference is equal to or larger than a predetermined foreground/background determination threshold, the foreground/background determination unit 352 determines that the relevant coordinates in the interpolation frame are the coordinates of a pixel in the foreground part. On the other hand, when the absolute value of the difference is less than the foreground/background determination threshold, it determines that the relevant coordinates in the interpolation frame are the coordinates of a pixel in the background part.

Hereinafter, processing that determines to which of the background part or the background part a pixel is applicable, using a pixel at the coordinates (xT+0.5, yT+0.5) in the interpolation frame as an example. The affine transformation parameters that are obtained as the global motion information are represented by a1, a2, a3, a4, a5 and a6.

The foreground/background determination unit 352 obtains the projected coordinates (xT, yT) of the coordinates (xT+0.5, yT+0.5) on the first frame T by calculating the following Equation (14).

$xT=f1xT+0.5+f2yT+0.5+f3$ $yT=f4xT+0.5+f5yT+0.5+f6$      Equation (14)

Note that the foreground/background determination unit 352 calculates f1, f2, f3, f4, f5 and f6 in Equation (14) by the following Equation.

$f1=(2a1a5-2a2a4+2a1)/d$ $f2=2a2/d$ $f3=(-a2a6+a3a5+a3)/d$ $f4=2a4/d$ $f5=\{(2a1+2)a5-2a2a4+2a1\}/d$ $f6=\{(a1+1)a6-a3a4\}/d$

The foreground/background determination unit 352 may calculate d in the above Equation by the following Equation (15).

$d=\{(a1+1)a5-a2a4+a1+1\}$      Equation (15)

The pixel value of the projected coordinates (xT, yT) on the first frame T calculated by Equation (14) is IT(xT, yT).

Further, the foreground/background determination unit 352 calculates the projected coordinates (xT+1, yT+1) of the coordinates (xT+0.5, yT+0.5) on the second frame (T+1) by calculating the following Equation (16).

$$xT+1 = g1xT+0.5 + g2yT+0.5 + g3$$

$$yT+1 = g4xT+0.5 + g5yT+0.5 + g6 \quad \text{Equation (16)}$$

Note that the foreground/background determination unit 352 calculates g1, g2, g3, g4, g5 and g6 in Equation (16) by the following Equation with use of d calculated by Equation (15).

$$g1 = (-2a5-2)/d$$

$$g2 = -2a2/d$$

$$g3 = (-a2a6 + a3a5 + a3)/3$$

$$g4 = 2a4/d$$

$$g5 = \{(2a1+2)a5 - 2a2a4 + 2a1\}/d$$

$$g6 = \{-(a1+1)a6 - a3a4\}/d$$

The pixel value of the projected coordinates (xT+1, yT+1) on the second frame calculated by Equation (16) is IT+1(xT+1, yT+1).

The foreground/background determination unit 352 calculates |IT(xT, yT)−IT+1(xT+1, yT+1)| and, if the value of the calculation result is equal to or larger than the foreground/background determination threshold, it determines that the coordinates (xT+0.5, yT+0.5) on the interpolation frame is a pixel in the foreground part. On the other hand, if |IT(xT, yT)−IT+1(xT+1, yT+1)| is smaller than the foreground/background determination threshold, it determines that the coordinates (xT+0.5, yT+0.5) on the interpolation frame is a pixel in the background part.

The foreground/background determination unit 352 makes the determination with respect to each pixel of the interpolation frame. Then, the foreground/background determination unit 352 inputs the information of the respective pixels determined to be the pixels of the background part among the pixels of the interpolation frame and the pixel value of the projected coordinates on the first frame and the pixel value of the projected coordinates on the second frame of the respective pixels to the background part pixel value determination unit 353. For example, when the above (xT+0.5, yT+0.5) is determined to be the pixel of the background part, the coordinates (xT+0.5, yT+0.5), the pixel values IT(xT, yT) and IT+1(xT+1, yT+1) specified at the time of determination are input to the background part pixel value determination unit 353. The same applies to the other pixels determined to be the pixels of the background part.

The background part pixel value determination unit 353 determines the pixel value of each pixel in the background part of the interpolation frame by using the information input from the foreground/background determination unit 352. The background part pixel value determination unit 353 sets the average value of the pixel value of the pixel in the background part at the projected coordinates on the first frame and the pixel value at the projected coordinates on the second frame as the pixel value of the pixel in the background part. For example, it is assumed that the coordinates of the pixel in the background part are (xT+0.5, yT+0.5), the pixel value at the projected coordinates on the first frame is IT(xT, yT), and the pixel value at the projected coordinates on the second frame is IT+1(xT+1, yT+1). In this case, the average value of IT(xT, yT) and IT+1(xT+1, yT+1) is the pixel value of (xT+0.5, yT+0.5). The background part pixel value determination unit 353 obtains the pixel value in the same manner for the respective pixels in the interpolation frame which are determined to be the background part.

Further, the foreground/background determination unit 352 inputs the information of the respective pixels determined to be the pixels of the foreground part among the pixels of the interpolation frame to the differential image generation unit 302. The motion vector candidate selection unit 301, the differential image generation unit 302, the binary image generation unit 303, the area image generation unit 304, the motion vector identifying unit 305 and the pixel value determination unit 306 execute the processing of Steps S1 to S8 only on the pixels that are determined to be the pixels of the foreground part among the pixels of the interpolation frame. This is the same as the processing of Steps S1 to S8 described earlier except that it is performed only on the pixels determined to be the foreground part, not on the whole pixels of the interpolation frame.

For example, in Step S1, the differential image generation unit 302 may perform initialization for the same coordinates as the coordinates of the pixels that are determined to be the pixels of the foreground part among the pixels of the reliability image, the x-component motion vector image and the y-component motion vector image. The other coordinates are ignored. After selecting the offset signal in Step S2, the differential image generation unit 302 calculates a difference between the pixel in the first frame and the pixel in the second frame which are specified by the pixel in the interpolation frame and the offset signal for the pixels determined to be the pixels of the foreground part in the interpolation frame, and assigns the calculated difference to the pixels at the same coordinates as the pixels determined to be the pixels of the foreground part, and thereby generates a differential image. In Step S4, the binary image generation unit 303 binarizes the pixel values of the pixels at the same coordinates as the pixels determined to be the pixels of the foreground part by using the differential image and generates a binary image. In Step S5, an area image is generated from the binary image regarding the pixels at the same coordinates as the pixels determined to be the pixels of the foreground part. In Step S6, the motion vector identifying unit 305 determines whether to update the pixels of the reliability image, the x-component motion vector image and the y-component motion vector image regarding the same coordinates as the pixels determined to be the pixels of the foreground part in the interpolation frame, and performs update when it determines to update them. Further, in Step S8, the pixel value determination unit 306 may calculate the pixel value with respect to each pixel in the foreground part of the interpolation frame among the pixels in the interpolation frame. Consequently, the pixel values of the pixels in the foreground part are determined.

Because the pixel values in the background part are determined by the background part pixel value determination unit 353, and the pixel values in the foreground part are determined in the processing of Steps S1 to S8, the pixel values of the respective pixels in the interpolation frame are determined. In other words, the interpolation frame is thereby generated.

Compared to a motion that is calculated locally for the foreground part, the global motion that is estimated for the entire image has a lower degree of freedom and thus has a smaller estimation error. Accordingly, if the embodiment is applied to the generation of an interpolation frame between consecutive frames in the cases of scrolling an artificial screen, taking a picture by panning, tilting or zooming a camera or the like, it is possible to obtain the pixel values of the background part that makes up a considerable proportion of the image with high accuracy based on the global motion. Further, because the pixel values of the foreground part with no global motion are obtained separately from the pixel values of the background part, it is possible to minimize the local interpolation part and improve the image quality of the interpolation frame.

The other processing is the same as in the case of gray-scale described earlier. The advantageous effects of the present invention can be obtained also when a pixel has R, G and B components.

In the embodiment described above, the configuration is described in which the differential image generation unit calculates the absolute value of a difference between the luminance values of pixels as a difference between a pixel in one frame and a pixel in another frame which are specified by a pixel in the interpolation frame and a motion vector candidate.

Further, the configuration is described in which the pixel value determination unit calculates, as the pixel value of a pixel in the interpolation frame, the average value of the luminance values of a pixel in one frame and a pixel in another frame which are specified by the pixel and a motion vector.

Further, the configuration is described in which the differential image generation unit calculates the sum of the absolute value of a difference between R components, the absolute value of a difference between G components, and the absolute value of a difference between B components, respectively, of pixels as a difference between a pixel in one frame and a pixel in another frame which are specified by a pixel in the interpolation frame and a motion vector candidate.

Further, the configuration is described in which the pixel value determination unit calculates, as the pixel value of a pixel in the interpolation frame, the average value of R components, the average value of G components, and the average value of B components of a pixel in one frame and a pixel in another frame which are specified by the pixel and a motion vector.

Further, the configuration is described in which the motion vector identifying unit determines, when an area image is generated, whether the largest value of a pixel value is updated or not with respect to each pixel of the area image, and, when the pixel value is updated, updates a motion vector of a pixel in the interpolation frame by setting a motion vector candidate that is selected at the time of generating the area image as the motion vector of the pixel in the interpolation frame at the same coordinates as the pixel in the area image whose pixel value is updated.

Further, the configuration is described which includes a global motion identifying unit (e.g. the global motion calculation unit 351) that identifies global motion information indicating a motion of an entire image between one frame and another frame, a pixel classification unit (e.g. the foreground/background determination unit 352) that classifies pixels in an interpolation frame into a pixel of a background part and a pixel of a foreground part based on the global motion information, and a background part pixel value determination unit (e.g. the background part pixel value determination unit 353) that calculates a pixel value of a pixel determined to be the pixel of the background part from pixel values of corresponding pixels in one frame and another frame, wherein, for a pixel determined to be the pixel of the foreground part in the interpolation frame, the differential image generation unit calculates a difference between a pixel in one frame and a pixel in another frame specified by the pixel and a motion vector candidate and generates a differential image where the difference is assigned to a pixel at the same coordinates as the pixel determined to be the pixel of the foreground part, the binary image generation unit generates a binary image where the differential image is binarized, the area image generation unit generates an area image from the binary image, the motion vector identifying unit identifies a motion vector for the pixel determined to be the pixel of the foreground part in the interpolation frame, and the pixel value determination unit determines a pixel value for the pixel determined to be the pixel of the foreground part in the interpolation frame.

Further, the configuration is described in which the pixel classification unit determines a pixel in the interpolation frame to be the pixel of the foreground part when an absolute value of a difference between a pixel value of a pixel in one frame specified from the global motion information and the pixel in the interpolation frame and a pixel value of a pixel in another frame specified from the global motion information and the pixel in the interpolation frame is equal to or larger than a threshold, and determines the pixel in the interpolation frame to be the pixel of the background part when the absolute value of the difference is smaller than the threshold.

Further, the configuration is described in which the background part pixel value determination unit calculates an average value of a pixel value of a pixel in one frame specified from the global motion information and the pixel in the interpolation frame and a pixel value of a pixel in another frame specified from the global motion information and the pixel in the interpolation frame and determines the average value as a pixel value of the pixel in the interpolation frame.

Further, the configuration is described in which the motion vector identifying unit calculates a parameter of affine transformation that transforms coordinates of a pixel in one frame into coordinates of a corresponding pixel in another frame as the global motion information.

Note that the image processing described above may be configured as a program to be executed by a computer. The program can be stored in a variety of kinds of storage media. Further, it can be transmitted via communication media. The storage media include a flexible disk, a hard disk, a magnetic disk, a magneto-optical disk, CD-ROM, DVD, ROM cartridge, RAM memory cartridge with battery backup, flash memory cartridge, nonvolatile RAM cartridge or the like. Further, the communication media include a wired communication medium such as telephone lines, a wireless communication medium such as a microwave circuit or the like, and further include the Internet.

Although the present invention is described with reference to the embodiments, the present invention is not limited thereto. Various changes and modifications as would be obvious to one skilled in the art may be made to the configuration and the details of the present invention without departing from the scope of the invention.

This application is based upon and claims the benefit of priority from Japanese patent applications Nos. 2008-085559 filed on Mar. 28, 2008 and 2008-301508 filed on Nov. 26, 2008, the disclosure of which is incorporated herein in its entirety by reference.

INDUSTRIAL APPLICABILITY

The present invention is suitably applied as an image processing system that inserts an interpolation frame between two consecutive frames of a motion picture.

The invention claimed is:

1. An image processing system for generating an interpolation frame to be inserted between one frame and another frame, comprising:

a motion vector candidate selection unit that selects predetermined motion vector candidates one after another;

a differential image generation unit that calculates a difference between a pixel in said one frame and a pixel in said another frame specified by a pixel in an interpolation frame and a motion vector candidate selected by the motion vector candidate selection unit, and generates a differential image where the difference is assigned to a pixel at the same coordinates as the pixel in the interpolation frame;

a binary image generation unit that generates a binary image where the differential image is binarized;

an area image generation unit that generates an area image where a pixel value of a pixel applicable to non-difference in the binary image is set to an area of a region where the pixel is linked and a pixel value of a pixel applicable to difference in the binary image is set to a given value;

a motion vector identifying unit that identifies a motion vector candidate with which a pixel value of a corresponding pixel in the area image is the largest as a motion vector with respect to each pixel in the interpolation frame; and a pixel value determination unit that determines a pixel value based on a pixel in said one frame and a pixel in said another frame specified by a motion vector identified by the motion vector identifying unit with respect to each pixel in the interpolation frame, wherein the motion vector identifying unit determines, when an area image is generated, whether a largest value of a pixel value is updated or not with respect to each pixel of the area image, and, when the pixel value is updated, updates a motion vector of a pixel in the interpolation frame by setting a motion vector candidate selected during generating the area image as a motion vector of a pixel in the interpolation frame at the same coordinates as a pixel in the area image whose pixel value is updated.

2. The image processing system according to claim 1, wherein the differential image generation unit calculates an absolute value of a difference between luminance values of pixels as the difference between a pixel in said one frame and a pixel in said another frame specified by a pixel in the interpolation frame and a motion vector candidate.

3. The image processing system according to claim 2, comprising:
a global motion identifying unit that identifies global motion information indicating a motion of an entire image between one frame and another frame;
a pixel classification unit that classifies pixels in an interpolation frame into a pixel of a background part and a pixel of a foreground part based on the global motion information; and
a background part pixel value determination unit that calculates a pixel value of a pixel determined to be the pixel of the background part from pixel values of corresponding pixels in said one frame and said another frame, wherein
for a pixel determined to be the pixel of the foreground part in the interpolation frame, the differential image generation unit calculates a difference between a pixel in said one frame and a pixel in said another frame specified by the pixel and a motion vector candidate, and generates a differential image where the difference is assigned to a pixel at the same coordinates as the pixel determined to be the pixel of the foreground part, the binary image generation unit generates a binary image where the differential image is binarized,
the area image generation unit generates an area image from the binary image,
the motion vector identifying unit identifies a motion vector for the pixel determined to be the pixel of the foreground part in the interpolation frame, and
the pixel value determination unit determines a pixel value for the pixel determined to be the pixel of the foreground part in the interpolation frame.

4. The image processing system according to claim 1, wherein the pixel value determination unit calculates, as a pixel value of a pixel in the interpolation frame, an average value of luminance values of a pixel in said one frame and a pixel in said another frame specified by the pixel and a motion vector.

5. The image processing system according to claim 4, comprising:
a global motion identifying unit that identifies global motion information indicating a motion of an entire image between one frame and another frame;
a pixel classification unit that classifies pixels in an interpolation frame into a pixel of a background part and a pixel of a foreground part based on the global motion information; and
a background part pixel value determination unit that calculates a pixel value of a pixel determined to be the pixel of the background part from pixel values of corresponding pixels in said one frame and said another frame, wherein
for a pixel determined to be the pixel of the foreground part in the interpolation frame, the differential image generation unit calculates a difference between a pixel in said one frame and a pixel in said another frame specified by the pixel and a motion vector candidate, and generates a differential image where the difference is assigned to a pixel at the same coordinates as the pixel determined to be the pixel of the foreground part,
the binary image generation unit generates a binary image where the differential image is binarized,
the area image generation unit generates an area image from the binary image,
the motion vector identifying unit identifies a motion vector for the pixel determined to be the pixel of the foreground part in the interpolation frame, and
the pixel value determination unit determines a pixel value for the pixel determined to be the pixel of the foreground part in the interpolation frame.

6. The image processing system according to claim 1, wherein the differential image generation unit calculates a sum of an absolute value of a difference between R components, an absolute value of a difference between G components and an absolute value of a difference between B components of pixels as the difference between a pixel in said one frame and a pixel in said another frame specified by a pixel in the interpolation frame and a motion vector candidate.

7. The image processing system according to claim 6, comprising:
a global motion identifying unit that identifies global motion information indicating a motion of an entire image between one frame and another frame;
a pixel classification unit that classifies pixels in an interpolation frame into a pixel of a background part and a pixel of a foreground part based on the global motion information; and
a background part pixel value determination unit that calculates a pixel value of a pixel determined to be the pixel of the background part from pixel values of corresponding pixels in said one frame and said another frame, wherein for a pixel determined to be the pixel of the foreground part in the interpolation frame, the differential image generation unit calculates a difference between a pixel in said one frame and a pixel in said another frame specified by the pixel and a motion vector candidate, and generates a differential image where the difference is assigned to a pixel at the same coordinates as the pixel determined to be the pixel of the foreground part, the binary image generation unit generates a binary image where the differential image is binarized, the area image generation unit generates an area image from the binary image, the motion vector identifying unit identifies a motion vector for the pixel determined to be the pixel of the foreground part in the interpolation frame, and the pixel value determination unit determines a pixel value for the pixel determined to be the pixel of the foreground part in the interpolation frame.

8. The image processing system according to claim 1, wherein the pixel value determination unit calculates, as a pixel value of a pixel in the interpolation frame, an average value of R components, an average value of G components and an average value of B components between a pixel in said one frame and a pixel in said another frame specified by the pixel and a motion vector.

9. The image processing system according to claim 8, comprising:

a global motion identifying unit that identifies global motion information indicating a motion of an entire image between one frame and another frame;

a pixel classification unit that classifies pixels in an interpolation frame into a pixel of a background part and a pixel of a foreground part based on the global motion information; and a background part pixel value determination unit that calculates a pixel value of a pixel determined to be the pixel of the background part from pixel values of corresponding pixels in said one frame and said another frame, wherein for a pixel determined to be the pixel of the foreground part in the interpolation frame, the differential image generation unit calculates a difference between a pixel in said one frame and a pixel in said another frame specified by the pixel and a motion vector candidate, and generates a differential image where the difference is assigned to a pixel at the same coordinates as the pixel determined to be the pixel of the foreground part, the binary image generation unit generates a binary image where the differential image is binarized, the area image generation unit generates an area image from the binary image, the motion vector identifying unit identifies a motion vector for the pixel determined to be the pixel of the foreground part in the interpolation frame, and the pixel value determination unit determines a pixel value for the pixel determined to be the pixel of the foreground part in the interpolation frame.

10. The image processing system according to claim 1, comprising:

a global motion identifying unit that identifies global motion information indicating a motion of an entire image between one frame and another frame;

a pixel classification unit that classifies pixels in an interpolation frame into a pixel of a background part and a pixel of a foreground part based on the global motion information; and a background part pixel value determination unit that calculates a pixel value of a pixel determined to be the pixel of the background part from pixel values of corresponding pixels in said one frame and said another frame, wherein for a pixel determined to be the pixel of the foreground part in the interpolation frame, the differential image generation unit calculates a difference between a pixel in said one frame and a pixel in said another frame specified by the pixel and a motion vector candidate, and generates a differential image where the difference is assigned to a pixel at the same coordinates as the pixel determined to be the pixel of the foreground part, the binary image generation unit generates a binary image where the differential image is binarized, the area image generation unit generates an area image from the binary image, the motion vector identifying unit identifies a motion vector for the pixel determined to be the pixel of the foreground part in the interpolation frame, and the pixel value determination unit determines a pixel value for the pixel determined to be the pixel of the foreground part in the interpolation frame.

11. The image processing system according to claim 10, wherein the pixel classification unit determines a pixel in the interpolation frame to be the pixel of the foreground part when an absolute value of a difference between a pixel value of a pixel in one frame specified from the global motion information and the pixel in the interpolation frame and a pixel value of a pixel in another frame specified from the global motion information and the pixel in the interpolation frame is equal to or larger than a threshold, and determines the pixel in the interpolation frame to be the pixel of the background part when the absolute value of the difference is smaller than the threshold.

12. The image processing system according to claim 11, wherein the background part pixel value determination unit calculates an average value of a pixel value of a pixel in one frame specified from the global motion information and the pixel in the interpolation frame and a pixel value of a pixel in another frame specified from the global motion information and the pixel in the interpolation frame, and determines the average value as a pixel value of the pixel in the interpolation frame.

13. The image processing system according to claim 11, wherein the motion vector identifying unit calculates a parameter of affine transformation that transforms coordinates of a pixel in one frame into coordinates of a corresponding pixel in another frame as the global motion information.

14. The image processing system according to claim 10, wherein the background part pixel value determination unit calculates an average value of a pixel value of a pixel in one frame specified from the global motion information and the pixel in the interpolation frame and a pixel value of a pixel in another frame specified from the global motion information and the pixel in the interpolation frame, and determines the average value as a pixel value of the pixel in the interpolation frame.

15. The image processing system according to claim 14, wherein the motion vector identifying unit calculates a parameter of affine transformation that transforms coordinates of a pixel in one frame into coordinates of a corresponding pixel in another frame as the global motion information.

16. The image processing system according to claim 10, wherein the motion vector identifying unit calculates a parameter of affine transformation that transforms coordinates of a pixel in one frame into coordinates of a corresponding pixel in another frame as the global motion information.

17. An image processing method for generating an interpolation frame to be inserted between one frame and another frame, comprising:
- selecting predetermined motion vector candidates one after another;
- calculating a difference between a pixel in said one frame and a pixel in said another frame specified by a pixel in an interpolation frame and a selected motion vector candidate, and generating a differential image where the difference is assigned to a pixel at the same coordinates as the pixel in the interpolation frame;
- generating a binary image where the differential image is binarized;
- generating an area image where a pixel value of a pixel applicable to non-difference in the binary image is set to an area of a region where the pixel is linked and a pixel value of a pixel applicable to difference in the binary image is set to a given value;
- identifying a motion vector candidate with which a pixel value of a corresponding pixel in the area image is the largest as a motion vector with respect to each pixel in the interpolation frame;
- when an area image is generated, determining whether a largest value of a pixel value is updated or not with respect to each pixel of the area image, and, when the pixel value is updated, updating a motion vector of a pixel in the interpolation frame by setting a motion vector candidate selected during generating the area image as a motion vector of a pixel in the interpolation frame at the same coordinates as a pixel in the area image whose pixel value is updated; and
- determining a pixel value based on a pixel in said one frame and a pixel in said another frame specified by an identified motion vector with respect to each pixel in the interpolation frame.

18. A non-transitory computer-readable recording medium storing an image processing computer program for generating an interpolation frame to be inserted between one frame and another frame, the image processing computer program causing a computer to execute:
- motion vector candidate selection processing that selects predetermined motion vector candidates one after another;
- differential image generation processing that calculates a difference between a pixel in said one frame and a pixel in said another frame specified by a pixel in an interpolation frame and a motion vector candidate selected by the motion vector candidate selection processing, and generates a differential image where the difference is assigned to a pixel at the same coordinates as the pixel in the interpolation frame;
- binary image generation processing that generates a binary image where the differential image is binarized;
- area image generation processing that generates an area image where a pixel value of a pixel applicable to non-difference in the binary image is set to an area of a region where the pixel is linked and a pixel value of a pixel applicable to difference in the binary image is set to a given value;
- motion vector identifying processing that identifies a motion vector candidate with which a pixel value of a corresponding pixel in the area image is the largest as a motion vector with respect to each pixel in the interpolation frame, and, when an area image is generated, determines whether a largest value of a pixel value is updated or not with respect to each pixel of the area image, and, when the pixel value is updated, updates a motion vector of a pixel in the interpolation frame by setting a motion vector candidate selected during generating the area image as a motion vector of a pixel in the interpolation frame at the same coordinates as a pixel in the area image whose pixel value is updated; and
- pixel value determination processing that determines a pixel value based on a pixel in said one frame and a pixel in said another frame specified by a motion vector identified by the motion vector identifying processing with respect to each pixel in the interpolation frame.

* * * * *